(12) United States Patent
Shavit

(10) Patent No.: US 11,603,213 B2
(45) Date of Patent: Mar. 14, 2023

(54) SYSTEM AND METHOD FOR AUTO-EXECUTION OF AIRCRAFT CHECK LISTS

(71) Applicant: ISRAEL AEROSPACE INDUSTRIES LTD., Lod (IL)

(72) Inventor: David Shavit, Karmei Yosef (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 388 days.

(21) Appl. No.: 16/342,806

(22) PCT Filed: Oct. 30, 2017

(86) PCT No.: PCT/IL2017/051178
§ 371 (c)(1),
(2) Date: Apr. 17, 2019

(87) PCT Pub. No.: WO2018/087745
PCT Pub. Date: May 17, 2018

(65) Prior Publication Data
US 2020/0047913 A1    Feb. 13, 2020

(30) Foreign Application Priority Data

Nov. 14, 2016 (IL) .......................................... 248975

(51) Int. Cl.
| | |
|---|---|
| G06F 3/048 | (2013.01) |
| B64D 43/00 | (2006.01) |
| G06F 3/0482 | (2013.01) |
| G05D 1/00 | (2006.01) |
| B64D 45/00 | (2006.01) |

(52) U.S. Cl.
CPC ............. *B64D 43/00* (2013.01); *B64D 45/00* (2013.01); *G05D 1/0061* (2013.01); *G06F 3/0482* (2013.01)

(58) Field of Classification Search
CPC ....... B64D 45/00; B64D 43/00; G06F 3/0482; G06Q 10/06316; G06Q 10/0631; G05D 1/0061
See application file for complete search history.

(56) References Cited

U.S. PATENT DOCUMENTS

| | | |
|---|---|---|
| 4,970,683 A | 11/1990 | Harshaw et al. |
| 5,454,074 A | 9/1995 | Hartel et al. |
| 6,753,891 B1 | 6/2004 | Chohan et al. |
| 7,289,890 B2 | 10/2007 | Mitchell et al. |

(Continued)

FOREIGN PATENT DOCUMENTS

WO    2015001112 A1    1/2015

OTHER PUBLICATIONS

PCT, "International Search Report", Application No. PCT/IL2017/051178, dated Jan. 29, 2018, 3 pages.

(Continued)

*Primary Examiner* — Aleksey Olshannikov
(74) *Attorney, Agent, or Firm* — Dorsey & Whitney LLP

(57) ABSTRACT

A method of aircraft operation, the method comprising accepting a human pilot's selection of at least one checklist from among plural checklists stored in computer memory; and, responsive to the pilot's selection, using a processor for automatically performing all operations included in the individual checklist.

19 Claims, 16 Drawing Sheets

(56) References Cited

U.S. PATENT DOCUMENTS

| | | |
|---|---|---|
| 8,260,736 B1 | 9/2012 | Lear et al. |
| 8,335,601 B2 | 12/2012 | Sham et al. |
| 2007/0150119 A1* | 6/2007 | Mitchell ............... G06Q 10/10 701/1 |
| 2010/0075614 A1* | 3/2010 | Judd .................. H04B 7/18506 455/73 |
| 2010/0204854 A1* | 8/2010 | Chang ..................... H04L 67/12 701/14 |
| 2010/0253692 A1 | 10/2010 | Cheymol et al. |
| 2010/0312420 A1* | 12/2010 | Sham ........................ B64F 5/60 701/3 |
| 2012/0209468 A1* | 8/2012 | Thomas ................. G06Q 10/06 701/29.1 |
| 2014/0172202 A1* | 6/2014 | Greene ................. G01S 13/882 701/4 |
| 2014/0277612 A1 | 9/2014 | Justin et al. |
| 2015/0261379 A1* | 9/2015 | Kneuper .............. G08G 5/0052 345/173 |
| 2016/0216849 A1 | 7/2016 | Kawalkar et al. |

OTHER PUBLICATIONS

Shah, , "Avionics Modification Research Analysis: From Electromechanical to Digital Avionics and from Digital to Integrated Modular Avionics (IMA)", 2014, 92 pages.

\* cited by examiner

| PSS Operation | Checklist Initiated |
|---|---|
| OFF to ON | Before start |
| ON to RUN | Engines start, Before taxi, Before takeoff |
| RUN to ON | Shutdown |
| ON to OFF | Secure |

| PSS Operation | Checklist Initiated |
|---|---|
| OFF to ON | Before start |
| ON to RUN | Engines start, Before taxi |
| RUN to FLT | Before takeoff or After takeoff |
| FLT to RUN | After landing |
| RUN to ON | Shutdown |
| ON to OFF | Secure |

| PSS Operation | Checklist Initiated |
|---|---|
| OFF to ON | Pre flight, Before start |
| ON to RUN | Engines start, Before taxi |
| RUN to FLT | Before takeoff or After takeoff |
| FLT to LAND | LAND |
| LAND to RUN | After landing |
| RUN to ON | Shutdown |
| ON to OFF | Secure |

| PSS Operation | Check lists Initiated |
|---|---|
| FWD | Next nominal checklist |
| BACK | Privies checklist |
| ALT 1 | Go Around or set for TO after land |
| ALT 2 | Before descent or APP |
| Center | Re initiate last checklist |

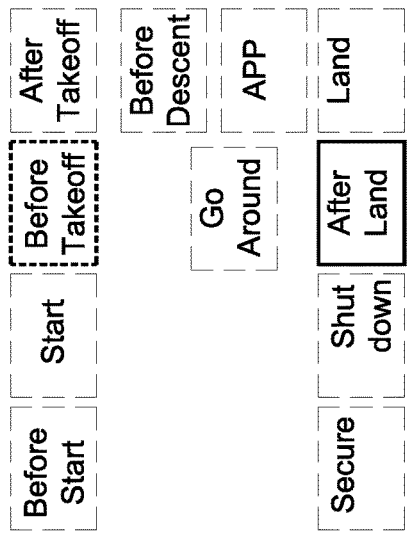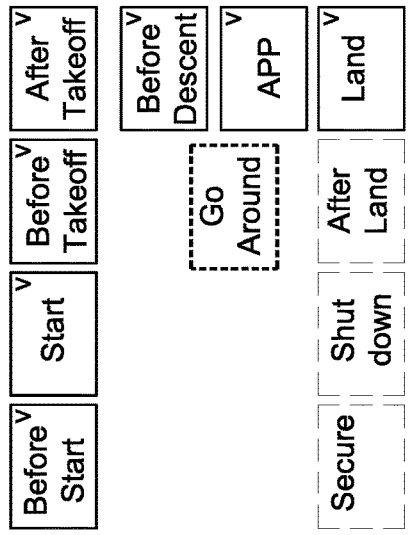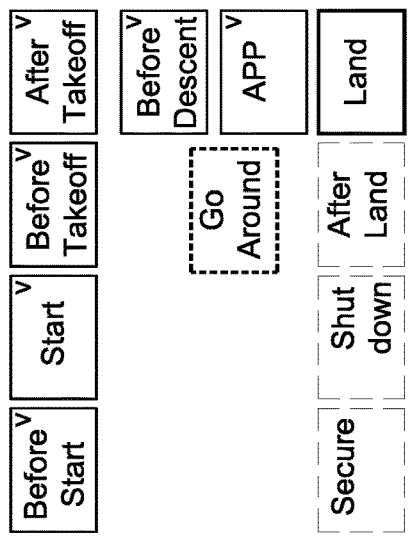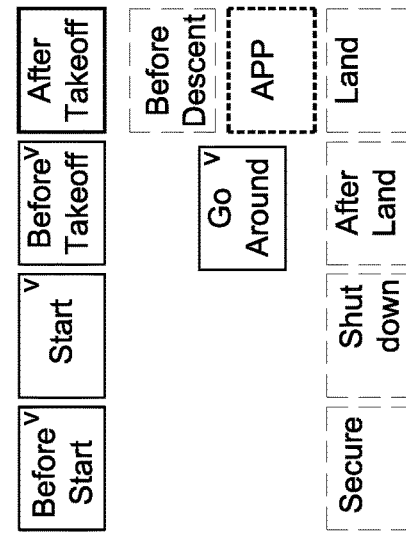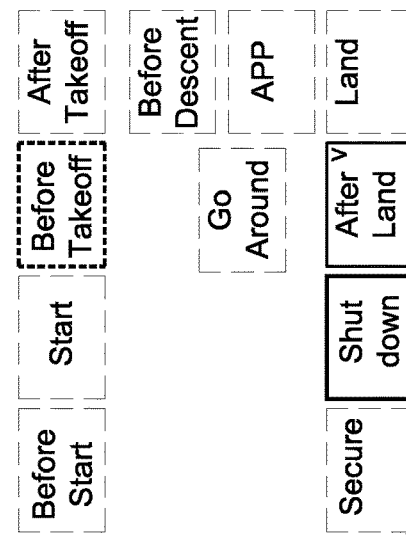
FIG. 7g  FIG. 7h  FIG. 7i  FIG. 7j  FIG. 7k  FIG. 7l

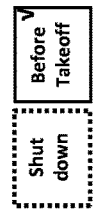
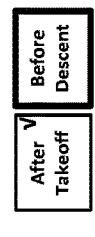
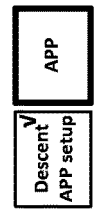
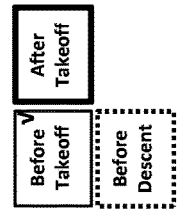
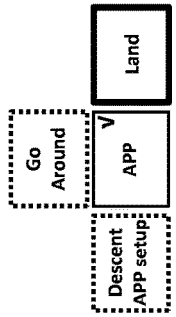
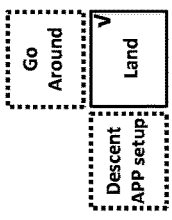
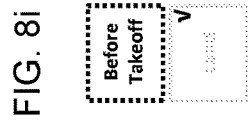
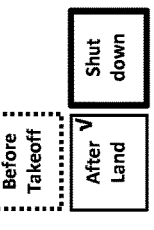
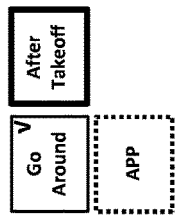

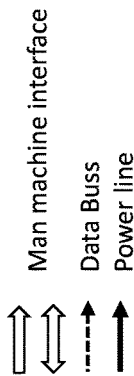
Man machine interface
Data Buss
Power line
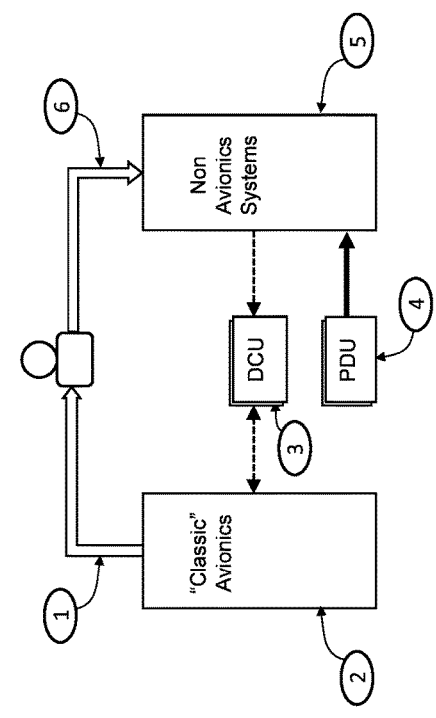
FIG. 10a
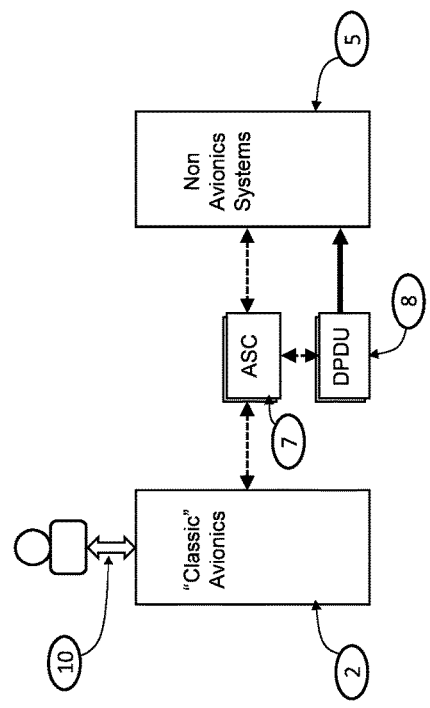
FIG. 10b

FIG. 11

| | Select Checklist | Combined PSS Option ||||||
|---|---|---|---|---|---|---|---|
| | | A | B1 | B2 | C | D | E |
| 31 | Before Start | 50 | | | | | |
| 32 | Start | | 51 | 51 | 52 | 53 | 53 |
| 35 | Before TO | 55 and/or touch screen | | | | | |
| 41 | After TO | | | | 55 and/or touch screen | 55 and/or touch screen | 55 and/or touch screen |
| 43 | Descent | | | 55 and/or touch screen | | | |
| 45 | APP | | 51 | 51 | 52 | 53 | 53 |
| 46 | Land | | | | | | |
| 36 | After Land | | | | | | |
| 37 | Shutdown | | | | | | |
| 38 | Secure | 50 | | | | | |

SYSTEM AND METHOD FOR AUTO-EXECUTION OF AIRCRAFT CHECK LISTS

FIELD

The present invention relates generally to aircraft and more particularly to aircraft with electronically controlled and/or monitored non-avionic systems.

BACKGROUND

Typically, a normal flight-deck checklist, aka normal checklist, includes a set of tasks aka items aka operations that a pilot is to perform or verify while performing ENGINE START, TAXI, TAKEOFF, etc. The normal checklist is typically read to or by the pilot/s who verifies or executes each item whether printed or electronic e.g. displayed on electronic flight screens or retained at least partly in human memory. Checklists are typically unique to each model of aircraft. Flight crews' improper use of, or failure to use checklists has long been noted and cited as a contributing factor to aircraft accidents.

Conventional technology constituting background to certain embodiments of the present invention is described in the following publications inter alia: U.S. Pat. No. 4,970,683.A, U.S. Pat. No. 7,289,890.B2, U.S. Pat. No. 8,335,601.B2, U.S. Pat. No. 5,454,074.A, U.S. 2014277612.A.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

Today's normal standard operation procedure (SOP) of typical turbine aircraft includes aircraft systems set up procedure of about 200 pilot actions without FMS (flight management system) set up. This includes systems set up confirmation (~45%), system set up changes or data input (~40%) and system checks (~15%). To reduce the safety risk of mist item or wrong set up, it is mandatory to follow strictly the certified check list (Checklist). The high level of safety of dual pilot SOP is based on one pilot reading each item from the list, and the other responding.

Under normal conditions, system Checklist is assigned to certain phases of the flight. Typically there are the following checklists (FIG. 1a): before-start, start, before-taxi, taxi, before-takeoff, after-takeoff, transition altitude, descent, transition level, approach, landing, after-landing, shutdown, secure. Typically, most of the normal Checklist items (85%-95%), are checked on the ground, before-takeoff, and after-landing. In a typical method of operation, it is the pilot in command or flying pilot's responsibility to call for initiating Checklist depending on the phase of flight/state of aircraft. Typically, the non-flying pilot calls an action required by the Checklist and the FP confirms it is done.

The aforementioned creates pilot work load, consume time, complex pilot training, increase operational cost and still cause pilot errors that can impact flight safety.

Rather than merely displaying a normal Checklist following pilot request, it is advantageous to automate performance of normal checklist/s, while leaving in the pilot's realm of responsibility selection of the correct checklist at the right time, which requires more complex judgment.

Certain embodiments seek to provide a system and method of operation to improve the simplicity and safety of flight.

Today's complex aircraft operational procedures include lists of hundreds of operations, called checklists, which pilots are required to follow. Checklists include procedures operative for checking and setting aircraft systems.

Certain embodiments seek to provide an aircraft system architecture eliminating some or all of this pilot workload e.g. by providing logic performing such procedures automatically according to a flight phase defined by the pilot and/or automatically by system logic.

For example, certain embodiments herein may be used to reduce hundreds of tasks done today by human pilots to ten (order of magnitude) flight phase selections by a human pilot.

Certain embodiments seek to harness a computer's ability to initialize, select modes of operation and monitor system parameters, in order to automatically perform checklists e.g. in accordance with flight-phases or other states defined by a pilot.

Advantages of certain embodiments of the present invention include significant reduction of pilot responsibilities thereby to achieve some or all of the following: reduce pilot training time and cost, support single pilot operation, reduce pilot error and improve safety, shorten aircraft operation time on ground, simplify system development, and improve system reliability.

Certain embodiments of the present invention enable operation of complex aircraft systems with a simplicity similar to vehicle operation. This is because a significant part of pilot operation of a complex aircraft includes:
1. Selecting a normal Checklist for the next phase of flight.
2. Execution of the selected Checklist.

Certain embodiments of the present invention provide a method of operation with a modified man machine interface, enabling the pilot to select normal Checklist or automatically triggered by pilot act or flight condition.

Certain embodiments of the present invention provide a new aircraft management module (AMC) which may include the logic of manual or auto Checklist selection and the Checklist which comprises a list of actions and some execution logic.

An aircraft system architecture that integrates the AMC with "conventional avionics" of an aircraft and integrates the AMC with a system computer (ASC) and digital power distribution unit (DPDU) and auto pilot and auto throttle may enable the AMC to receive aircraft flight conditions from the "conventional avionics" control and monitoring of aircraft non-avionics systems by the ASC, control the electrical supply by the DPDU, and control aircraft flight path through auto pilot (AP) and auto throttle (AT).

Certain embodiments are operative for some or all of:
1. Simplifying aircraft operation by reduction of hundreds of pilot actions and responsibilities, thereby rendering piloting far more similar to driving a car.
2. Reduction of operational time required on ground by virtue of a system that executes its checklists faster
3. Improve safety by eliminating human pilot errors confounding checklist execution and enabling pilot to concentrate on other flight tasks that require human expertise
4. Reduce initial and recurrent pilot training thereby to save time and cost
5. Support single pilot operation of state of the art aircraft 6. Improve system reliability by providing optimized sequences of activation For aviation enthusiasts, an advantage of the present invention is enjoying the fun of piloting without the risk and nuisance involved in manual execution of Checklist procedures. Embodiments which may achieve this include:

Embodiment a. A method to operate an aircraft that enables to substitute hundreds of pilot normal checklist manual actions in a complex aircraft by 6-10 manual selections. Pilot selects 8-10 next checklist to execute according the phase of the flight and the system execute this checklist automatically.

Embodiment b. A method for a pilot to select manually some normal flight checklists Embodiment c. A method for the system to select automatically some normal checklists Embodiment d. A method for automatic execution of a check list following its selection.

Embodiment e. A method to evaluate automatically aircraft states while executing procedure steps Embodiment f. A method to respond automatically to failure detection while executing procedure steps Embodiment g. A method to present to the pilot states of successful phase check list completion Embodiment h. A method to present to the pilot failure and/or no completion of phase check list Embodiment i. System architecture to support any of the above embodiments Embodiment j. Enable Ground station with Remote pilot, to execute Checklist Embodiment k. Enable ATC (air traffic control) and ground operation or GS to receive, automatically, check list in process.

Certain embodiments of the present invention seek to provide at least one processor in communication with at least one memory, with instructions stored in such memory executed by the processor to provide functionalities which are described herein in detail.

There is thus provided, in accordance with at least one embodiment of the present invention, a method of aircraft operation, the method comprising: accepting a human pilot's selection of at least one checklist from among plural stored checklists; and responsive to the pilot's selection, automatically performing all operations included in the individual checklist.

Plural normal checklists are respectively associated with plural aircraft normal states e.g.—one checklist is to be performed before-start, another is to be performed at start, a third before-take-off, a fourth at takeoff etc., typically, a pilot indicates a certain state to the system herein e.g. The pilot chooses a state from among a state menu including, say, before-start, start, before-takeoff, takeoff—and responsively, all operations in the checklist associated with the state the pilot has manually selected, are performed automatically.

It is appreciated that storing the checklists as corresponding to aircraft states and automatically performing checklists responsive to a pilot's manual selection of the current aircraft state, may drastically simplify pilot functioning thereby to enhance safety—e.g, by reducing 100, 200 or several hundred pilot operations which may be performed today, to just a few e.g. 5 or 8 or 10 pilot aircraft state selection operations (e.g. corresponding to the states shown in FIG. 1c). Alternatively or in addition, stored checklists may be preconfigured to be automatically performed if and when triggered by an automatically sensed state—rather than or logically combined with a pilot's manual selection of a current aircraft state associated with a particular stored checklist.

Any number of human-pilot defined states may be defined e.g. between 5 and 10 states, or more, or less. Any number of automatically sensed states may also be defined e.g. perhaps 3 or 4 or 5 or 6 or 7 states, or more, or less. Each checklist may include any suitable number of operations e.g. 5-50 operations, or more, or less. Often, some checklists are longer than (includes more operations than) others, e.g. the checklist performed when an aircraft is in its "before-start" state, according to a particular aircraft's literature, may be longer than other checklists performed, according to the aircraft's literature, when the aircraft is in other states.

According to certain embodiments, the method shown and described herein, may assume use of an ASC such as, for example, the computer which controls the non-avionics systems in the Eclipse 500 supplied by Curtiss-Wright and in the Pc-24 supplied by IS & S, and having an external interface e.g. between the ASC and other airborne systems. This architecture may allow commands to reach appropriate modules as mandated by various operations in various checklists. Then, checklists from the AFM (aircraft flight manual) of an ASC-concept aircraft to be automated, are converted into code which is compatible with the protocol governing the external interface, and instructs the computer to automatically execute the checklist e.g. as described herein, responsive to pilot manual input, to automatic detection of certain states, or to ground station signals.

The following terms may be construed either in accordance with any definition thereof appearing in the prior art literature or in accordance with the specification, or as follows:

Avionics: intended to include Aviation electronic equipment, e.g. as shown in FIG. 10 at reference numeral 2, that enables the pilot to aviate, navigate, and communicate. Typically, the avionics include some or all of the following subsystems: (a) man machine interface typically comprising displays, controls and audio system; and (b) air data sensors and computer (ADC), (c) navigation modules (For example: GPS, AHARS, IRS, RNAV), (d) radio modules including voice and data (For example: VHF radio, SAT COM, transponder), (e) weather module (For example: weather radar, lightning detector), (f) traffic collision avoidance module (For example: transponder, TCAS, ADS-B), (g) ground proximity avoidance module (For example: GPWS, RA) and (h) flight management system (FMS) to plan and program the flight. Typically interface between avionics modules occurs by high speed data bus. The data bus architecture typically comprises either a point to point bus (For example: ARINC 439) or a shared bus with multi-transmitters and multi-receivers (For example: military 1553 max bus).

Non-avionics: Typically include the following systems: flight control, engine, fuel, environmental control systems (ECS), hydraulics, landing gear, lights, anti-ice systems, fire extinguishing systems, electrical system, auxiliary power units and passenger cabin systems.

Aircraft system computer (ASC): intended to include a computer used to control all or some of an aircraft's non-avionic equipment which provides monitoring and operating functionalities for controlled non avionics systems. Aircraft built according to the ASC concept e.g. the Eclipse 500 and the Pilatus PC-24. The ASC interfaces e.g. by data bus or analog discretes with the non-avionic equipment on the one hand, and with the avionics system and pilot MMI, by data bus, on the other hand. Acronyms are intended to include:

A—Checklist procedure is selected and initiated automatically
S—Checklist procedure is selected manually from options suggested by the sys.
M—Checklist procedure is selected manually
ADC—Air data computer
AFM—Aircraft flight manual
AMC—Aircraft management computer
AMMI—Avionics man machine interface
AP—Auto pilot
ASC—Aircraft system computer
AT—Auto throttle
ATC—Air traffic control
ATIS—Automatic Terminal Information Service
CAS—Crew alerting system
COM—Communication
CHK—Checklist
COTS—Commercial off-the-shelf
CPDLC—Controller-pilot data link communications
DCU—Data concentration unit
DL—Data link
DPDU—Digital power distribution unit
DU—Display unit
ECS—Environment control system
FADEC—Full authority digital engine control
FL—Flight level
FMS—Flight management system
FP—Flaying pilot
IMU—Integrated avionics unit
M—Mach
ME—Manual execution of checklist
MEL—Minimum equipment list
MMEL—Master minimum equipment list
MMI—Man machine interface
NAV—Navigation module PDU—Power distribution unit (based on relays)
POF—Phase of flight
PIC—Pilot in command
PSS—Phase selector switch
PSMS—Phase selector momentary switch
ROC—Rate of climb
SOP—Standard operation procedure
TAT—True air temperature
TCA—Traffic collision avoidance module
TO—Takeoff
TOGA—Takeoff and go-around
TS—Touch screen
V1—The speed beyond which the takeoff should no longer be aborted
Vc—Calibrated air speed
VFlap—Minimum speed to retract flaps
WX—Weather module (radar and weather data link)

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g, on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs. BluRays, magnetic-optical discs or other discs; RAMS, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage. The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASK:), etc. and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

In FIGS. 1a-1c, solid arrows indicate a nominal flow whereas dashed arrows indicate an optional flow.

FIGS. 7a-l illustrates an example touch screen Phase Selector Switch display and control expanded schematic layout.
FIGS. 8a-l illustrates an example touch screen Phase Selector Switch display and control—compact schematic layout
FIG. 9a (prior art) illustrates a pilot MMI in a state of the art aircraft
FIG. 11 illustrates an example combination of Phase Selector Switch controls.

Figure 1A:
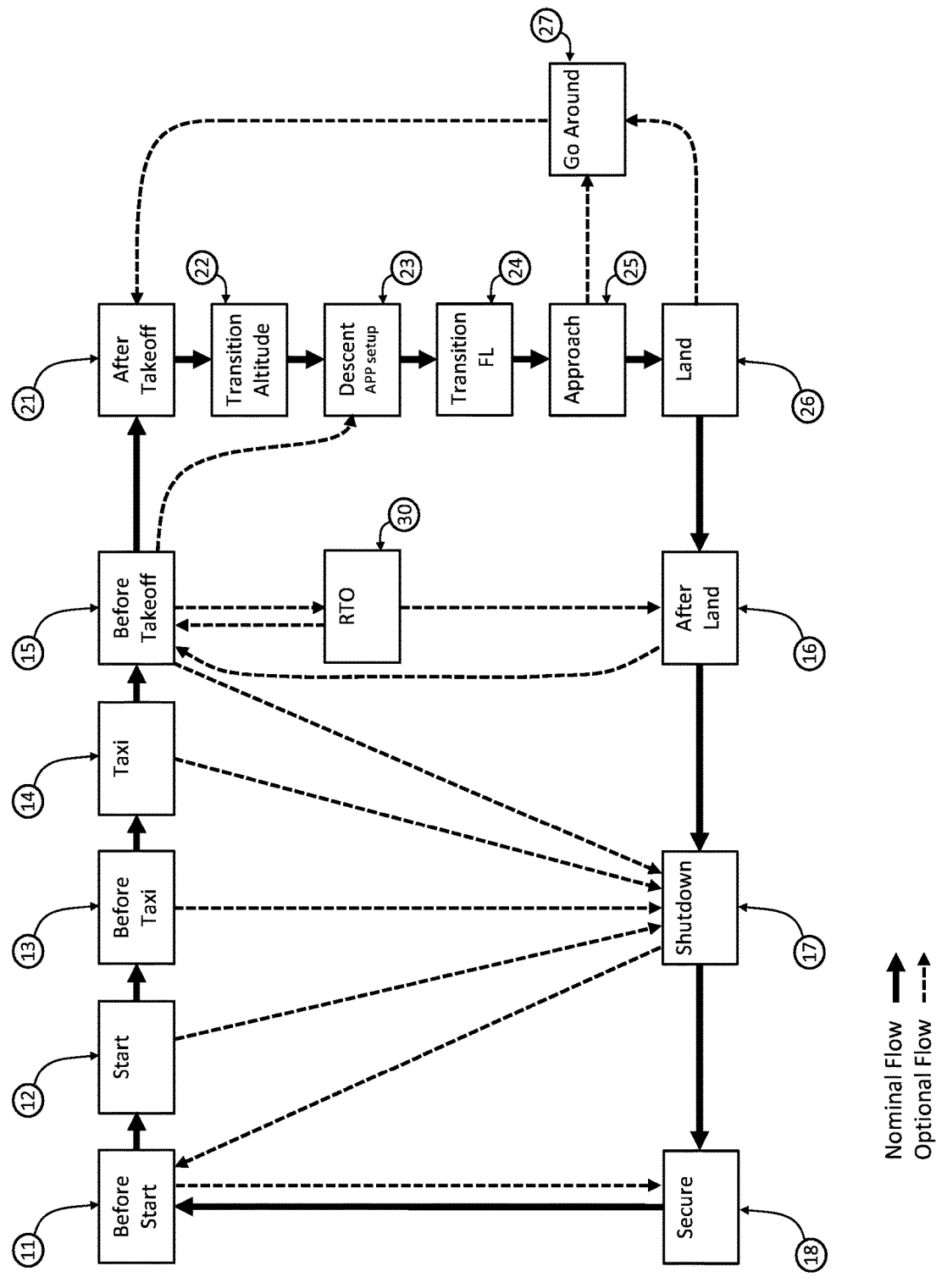
FIG. 1a illustrates example normal checklists.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

The present invention typically includes at least the following embodiments:

Embodiment 1: A method of aircraft operation, the method comprising:
accepting a human pilot's selection of at least one checklist from among plural stored checklists; and
responsive to the pilot's selection, automatically performing all operations included in the individual checklist.

Figure 10C:
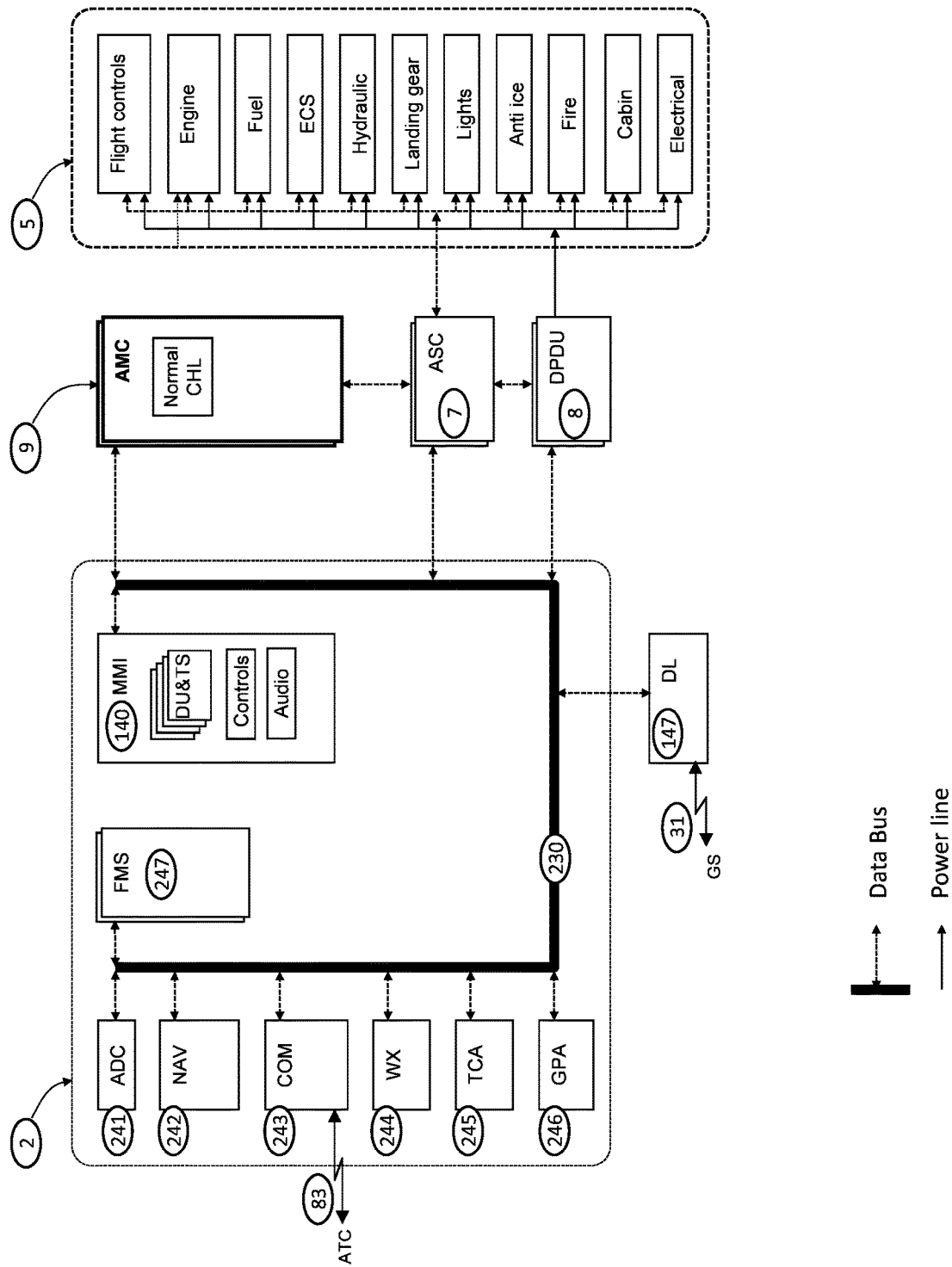
FIG. 10c is an aircraft system integration function block diagram (example common-bus implementation provided according to some embodiments).

Embodiment 2. An aircraft operation device ("AMC"), operative in conjunction with an aircraft having:
avionics including avionic subsystems and an MMI (man-machine interface), non-avionic systems, and a computer (ASC) operative to control the non-avionic systems, the device including:
a checklist data repository operative to store, in computer memory, plural checklists including digital representations of at least one operation, wherein at least one of the checklists includes plural operations, some of which are to be performed in the aircraft's non-avionic systems, and others to be performed in the aircraft's avionic subsystems;
at least one data bus providing a first data interface, governed by a first predetermined protocol, to the ASC and a second data interface, governed by a second predetermined protocol to the avionics;
logic operative to access the repository and to selectably perform at least one individual checklist from among the plural checklists including:
generating commands, at least some of which are compatible with the first protocol and instruct the ASC to interface with at least one non-avionic system from among the non-avionic systems in accordance with an operation from among the plural operations in the individual checklist and at least some of which are compatible with the second protocol and instruct the AMC to interface with at least one subsystem from among the avionic subsystems in accordance with an operation from among the plural operations in the individual checklist;
feeding the commands compatible with the first protocol to the ASC via the first data interface and the commands compatible with the second protocol to the avionics via the second data interface.

according to certain embodiments, a single data bus is employed e.g. because the first and second protocols, hence the two interfaces, are the same e.g. as shown in FIG. 10c. According to certain embodiments, at least some checklists include only operations to be performed in the aircraft's non-avionic systems. According to certain embodiments, at least some checklists include only operations to be performed in the aircraft's avionic systems. According to certain embodiments, at least some checklists such as the checklist performed when an aircraft is in its "before-start" state, include both operations to be performed in the aircraft's non-avionic systems and operations to be performed in the aircraft's avionic systems.

Figure 12:
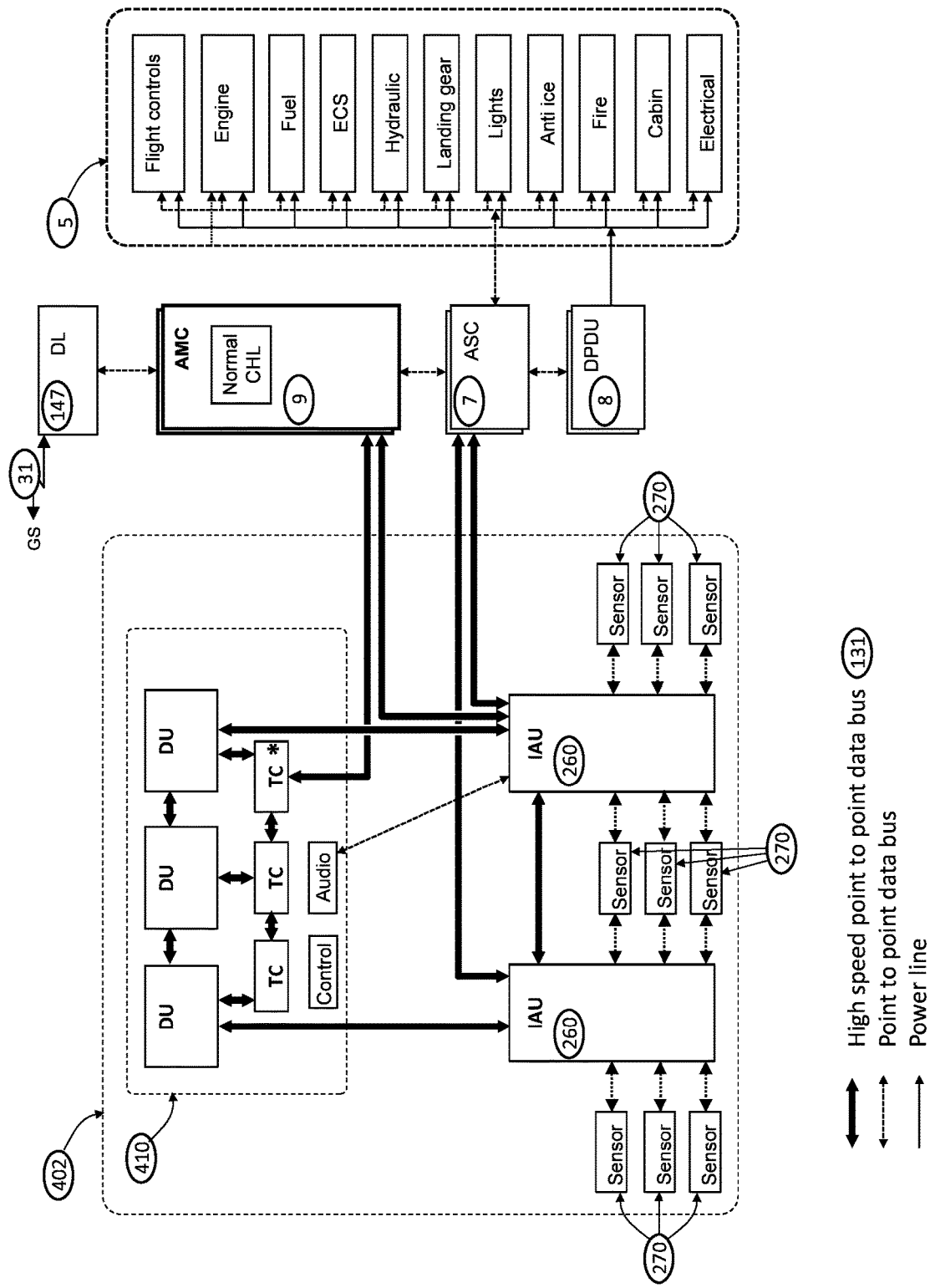
FIG. 12 is an aircraft system integration function block diagram (example point to point bus implementation provided according to some embodiments).

It is appreciated that the communication between the AMC and the avionics depends on the architecture of the avionics. For example, if the avionics has a bus architecture e.g. as shown in FIG. 10, the commands generated by the AMC logic may be fed directly to the avionics' main bus. Alternatively, if for example the avionics has a point-to-point architecture e.g. as shown in FIG. 12, the commands generated by the AMC logic may be fed to any one of the avionics' modules since each module is configured to pass each such command on to a relevant other module, as appropriate.

Embodiment 3. A device according to any of the preceding embodiments wherein the at least one data bus also provides an interface between the logic and the MMI and wherein the logic provides at least one multi-value signal to a pilot, via the MMI, wherein the signal's plural values respectively indicate at least some of the following statuses of at least one individual checklist: "completed entirely successfully", "completed partially successfully", and "failed".

Embodiment 4. A device according to any of the preceding embodiments wherein at least one individual command from among the commands compatible with the first protocol, instructs the ASC to control at least one non-avionic system from among the non-avionic systems to carry out those of the plural operations performed in the aircraft's non-avionic systems and included in the at least one individual checklist which are to be carried out by the non-avionic systems.

Embodiment 5. A device according to any of the preceding embodiments wherein at least one individual command from among the commands compatible with the first protocol, instructs the ASC to check a desired setting of at least one non-avionic system from among the non-avionic systems.

Embodiment 6. A device according to any of the preceding embodiments wherein the operations which the avionics is instructed to perform comprise at least one of: operating an automatic pilot; and operating an automatic throttle.

Embodiment 7. A device according to any of the preceding embodiments wherein at least one individual command from among the commands compatible with the second protocol, instructs the AMC to control at least one avionic subsystem from among the avionic subsystems to carry out those of the plural operations performed in the aircraft's avionic subsystems and included in the at least one individual checklist which are to be carried out by the avionic subsystems.

Embodiment 8. A device according to any of the preceding embodiments wherein at least one individual command from among the commands compatible with the second protocol, instructs the AMC to check a desired setting of at least one avionic subsystem from among the avionic subsystems.

Embodiment 9. A device according to any of the preceding embodiments wherein the command which instructs the ASC to check also comprise logic, pending on a result of the check, which configures at least one subsequent operation in at least one of the plural checklists.

Configuration of at least one subsequent operation may for example comprise terminating or interrupting or aborting or omitting at least one operation, performing at least one operation if and only if a logical condition is fulfilled, modifying at least one subsequent operation.

Embodiment 10. A device according to any of the preceding embodiments and also comprising a switch and associated switch logic that enable manual selection of at least one checklist from among the plural checklists.

Embodiment 11. A device according to any of the preceding embodiments wherein the switch comprises a momentary switch.

Embodiment 12. A method according to any of the preceding embodiments wherein the accepting comprises providing a switch and associated switch logic that enable manual selection of at least one checklist from among the plural stored checklists.

Embodiment 13. A device according to any of the preceding embodiments wherein the first protocol and the second protocol are the same.

Embodiment 14. A method according to any of the preceding embodiments wherein the plural checklists comprise normal checklists.

Embodiment 15. A device according to any of the preceding embodiments wherein performance of at least one checklist by the logic is triggered by a signal arriving from a ground station.

Embodiment 16. A device according to any of the preceding embodiments wherein the ground station receives from the logic, at least one status of at least one individual checklist.

Embodiment 17. A device according to any of the preceding embodiments wherein performance of at least one checklist by the logic is triggered manually by at least one pilot command conveyed via the interface between the logic and the MMI.

Embodiment 18. A device according to any of the preceding embodiments wherein performance of at least one checklist by the logic is triggered automatically responsive to electronically detected aircraft states.

Embodiment 19. A method according to any of the preceding embodiments wherein the automatically performing comprises:

providing at least one data bus providing at least one data interface, governed by at least one predetermined protocol, to at least one computer interfacing with at least one airborne electronically operated system; and providing logic operative, responsive to the human selection, to perform the individual checklist including:
generating commands, each of which are compatible with the at least one protocol and instructing the at least one computer to interface with the at least one airborne system in accordance with an operation from among the plural operations in the individual checklist; and
feeding the commands to the at least one computer via the at least one data interface.

Embodiment 20. A computer program product, comprising a non-transitory tangible computer readable medium having computer readable program code embodied therein, the computer readable program code adapted to be executed to implement an aircraft operation method comprising the following operations:
accepting a human pilot's selection of at least one checklist from among plural stored checklists; and
responsive to the pilot's selection, automatically performing all operations included in the individual checklist.

Aircraft literature mandates certain procedures in flight which include normal checklists done routinely in each flight as opposed to Abnormal checklists selected in case of systems failure, to overcome the failure and to enable safe landing.

Auto execution of checklists includes two phases: (a) Selecting the correct checklist (b) Auto executing the selected checklist.

Conventional checklists are defined in aircraft literature as part of the AFM and are certified during each aircraft development. Each typically comprises a sequence of operations or actions that can be programmed for automatic execution e.g. as described herein.

Certain embodiments of the present invention include (a) a method to select normal checklist, and/or (b) a system to enable the auto execution of the checklist FIG. 1a shows typical 14 Checklist procedures aka operations pilots execute manually in a flight:

(11) Before-start: Include initiating, setting and checking the aircraft systems and some coordination with ATC. This procedure is typically the longest of all.

(12) Start: Additional systems initiation (for example: fuel pumps) and engines start

(13) Before-taxi: Reconfiguring systems and/or checking them with engines running (for example: set bleed air from engine and check anti ice)

(14) Taxi: Setting and checking additional systems during taxi (for example: brakes)

(15) Before-takeoff: Last setting and checking system for takeoff (for example: lights & heading check)

(21) After-takeoff: Reconfigure aircraft from takeoff to cruise configuration (for example: landing gear up)

(22) Transition ALT: Typically does not appear in official Checklist but is required at least to set up barometric altitude above transition altitude

(23) Before-descent: The main objective of this procedure is to set aircraft flight management and pilots briefing for the landing. A more suitable name could be "landing set up and briefing" but it is a good practice to execute the set up on the cruise phase, where workload is less, and before the more intense workload of the descent phase. In some scenarios this procedure is done without actual descent (for example: at low level flight, or when an update for landing RWY is required)

(24) Transition FL: Typically does not appear in official Checklist but is required at least to set up barometric altitude below transition flight level

(25) Approach: Include some system setup and checks for approach (for example: initial flaps setup)

(26) Land: Last setting and check before landing (for example: flaps at landing position and landing down)

(16) After-land: Include system set up (for example: flaps up).

(17) Shutdown: setting system and engine to shut down. Includes additional systems checks and download of flight parameters for logging and maintenance.

(18) Secure: setting to power off and set power to off

(27) Go-around: Can be initiated from approach or landing phase. Includes reconfiguration for takeoff (for example: trust and flaps to takeoff set up)

(30) RTO: Rejected takeoff is an abnormal scenario but typically it is followed by normal flight phases (after-landing or before-takeoff) hence may be regarded as including normal procedure/s.

Normal Checklist Selection

Figure 1B:
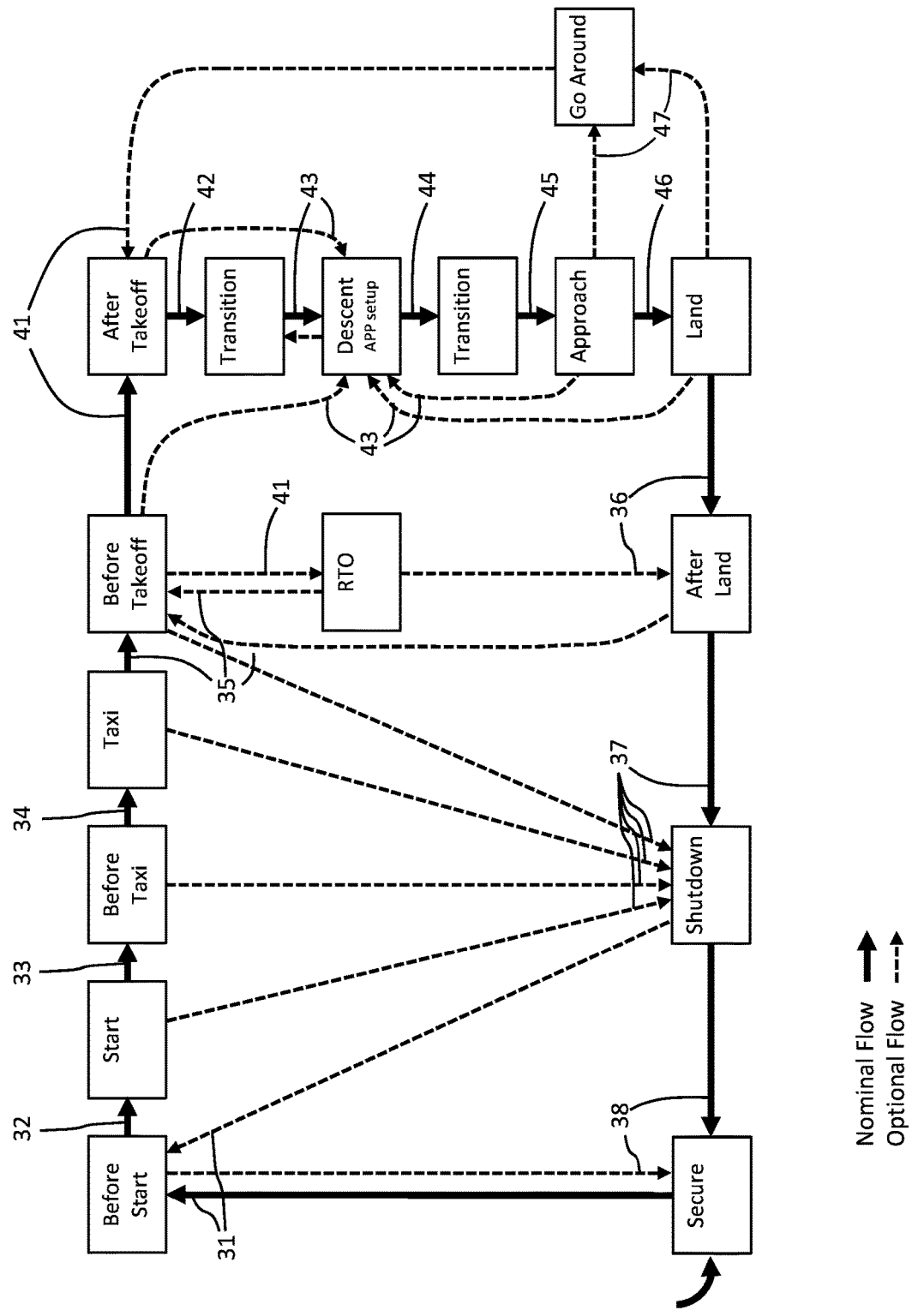
FIG. 1b illustrates a typical normal checklists flow chart

Execution of normal Checklist can be described as transitions of a state machine that brings the system to a new state, in this case a phase of the flight (POF). The phases of flight have a defined normal sequencing flow through the flight (FIG. 1b bold arrows) and may have alternative sequencing (FIG. 1b broken line arrows). The following describes how these transitions (initiating Checklist) may be defined.

Certain embodiments of the present invention include several different controls that enable alternative applications. The following description relates to each of these alternatives:

(31) Initiating before-start procedure is done manually by moving Phase Selector Switch from OFF to ON (FIG. 3-4).

(32) Initiating start procedure is done manually by moving Phase Selector Switch from ON to RUN (FIG. 3-4) or by PSMS momentarily FWD (FIG. 5) or by selecting start on touch screen (FIG. 7-8). This may be done only after before-start has been successfully completed.

(33) Initiating before-taxi procedure is done automatically after start procedure has been successfully completed.

(34) Initiating taxi procedure is done automatically after before-start procedure has been successfully completed and aircraft is in motion.

(35) Initiating before-takeoff procedure may be implemented automatically after before-taxi procedure has been successfully completed (FIG. 2) or may be implemented manually by moving Phase Selector Switch to FLT (FIG. 3-4) or by pushing PSMS momentarily FWD (FIG. 5) or by selecting before takeoff on touch screen (FIG. 7-8).

(41) Initiating after-takeoff procedure may be triggered manually by pilots moving landing gear handle to UP. That which follows after-takeoff procedure is done automatically pending on aircraft air speed and altitude, (for example: flaps may be retracting as speed increases above $V_{Flap}$).

Manual initiation of implementation of cockpit w/o landing gear handle can be carried out by pushing PSMS momentarily FWD (FIG. 5) or selecting after-takeoff on touch screen (FIG. 7-8). In this case the procedure may be available only when safety conditions are reached (for example: speed+Rate of Climb (ROC)+minimum height above ground)

Automatic initiation for an implementation of cockpit w/o landing gear handle can be set by flight condition only, (for example: speed+Rate of Climb (ROC)+minimum height above ground)

(42) Initiating transition altitude procedure is initiated automatically by flight condition (for example: climb above transition altitude).

(43) Manual selection may be required to complete pilot inputs and briefing. The manually initialization can be done by selecting Phase Selector Switch to LAND position (FIG. 4) or by pushing PSMS momentarily FWD (FIG. 5) or selecting before-descent on touch screen (FIG. 7-8). Automatic initialization may be set to TBD (parameter to be determined as appropriate for a particular aircraft and situation) minutes before descent or TBD distance before destination if runway and approach flight plan are defined.

(44) Initiating transition FL procedure is initiated automatically by flight condition (for example: descending below transition flight level)

(45) Initiating approach procedure is done manually by pushing momentarily PSMS FWD (FIG. 5) or by selecting APP on the touch screen (FIG. 7-8). In both cases the actual execution of some items may be pending on flight conditions (for example: height above destination, range, speed).

(46) Initiating land procedure is done manually after-approach procedure has been completed by pushing momentarily PSMS (phase selector momentary switch) FWD (FIG. 5) or by selecting LAND on the touch screen (FIG. 7-8). In both cases execution landing gear and flaps extension may be pending their speed limits.

(47) Initiating go around procedure may be triggered automatically when pilot activates the TOGA switch. Retracting landing gear may be pending positive Rate of Climb (ROC) and minimum height. Retracting flaps extension may be pending on speed.

(36) Initiating after-landing procedure may be enabled only after-landing at taxi speed. Under these conditions it may be done automatically (FIG. 2) or manually by selecting Phase Selector Switch from FLT to RUN (FIG. 3-4) or by pushing momentarily PSMS to AFT (FIG. 5) or by selecting after-land on touch screen (FIG. 7-8).

(37) Initiating shutdown procedure is done manually by moving Phase Selector Switch from RUN to ON (FIG. 2-4) or by selecting shutdown on touch screen when aircraft is on ground and not moving.

(38) Initiating secure procedure is done manually by selecting Phase Selector Switch from ON to OFF (FIG. 2-4) pending that shutdown has been completed.

Normal Checklist Manual Selection Control

Initiation of a checklist to be performed is done in some cases by pilot selection, and in others is triggered by automatically sensed conditions. There are several options for checklist manual selection suited to various specific aircraft characteristics.

An example man machine interface (MMI) with Checklist controls is described below in detail.

The following normal check list controllers are example implementations which enable multiple aircraft initialization and shut down operations to be automated, e.g. but for 2 or 5 or 10 pilot actions, thereby to facilitate a pilot user experience operation which resembles automobile driving in its simplicity.

Typically, presenting several alternatives enables optimal adaption of a controller, by aircraft complexity (3, 4 or 5 positions) and by style of operation, aka user input mode (e.g. knob with fixed positions or momentary switch or touch screen).

Figures 2A, 2B:
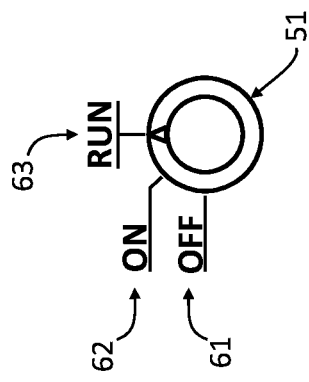
FIG. 2a illustrates an example 3 position Phase Selector Switch—schematic layout
FIG. 2b illustrates example function for a 3 position Phase Selector Switch. Generally, tables herein may include some or all of the columns and/or rows actually illustrated.

FIG. 2a is a schematic illustration of an exemplary three fixed position knob control (51) for a normal check list selection on ground. The illustrated knob has three fixed positions: OFF (61), ON (62) and RUN (63).

FIG. 2b defines example knob logic e.g. for the knob of FIG. 2a; here and in other logic diagrams, some or all components of the logic may be provided: Shifting from OFF to ON initiates a before-start Checklist (31). Shifting from ON to RUN initiates engine start, before-taxi and before-takeoff Checklists (32, 34, 35). Shifting from RUN to ON initiates after-land if not performed previously and shutdown Checklists (36, 37). Shifting from ON to OFF initiates a secure Checklist (38).

Figures 3A, 3B:
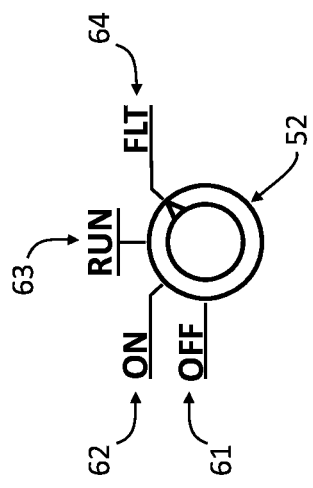
FIG. 3a illustrates an example 4 position Phase Selector Switch—schematic layout
FIG. 3b illustrates a example function for a 4 position Phase Selector Switch

FIG. 3a illustrates an exemplary example of a four fixed position knob control (52) for normal check list selection on ground. The knob may be similar to knob (51) with an additional FLT position (64).

FIG. 3b defines example knob logic e.g. for the knob of FIG. 3a: Shifting from OFF to ON initiates a before-start Checklist (31). Shifting from ON to RUN initiates engine start and before-taxi Checklists (32, 33). Shifting from RUN to FLT may initiate a before-takeoff Checklist or an after-takeoff Checklist (41). Shifting from FLT to RUN initiates an after-landing Checklist (36). Shifting from RUN to ON initiates a shutdown Checklist (37). Shifting from ON to OFF initiates a secure Checklist (38).

Figures 4A, 4B:
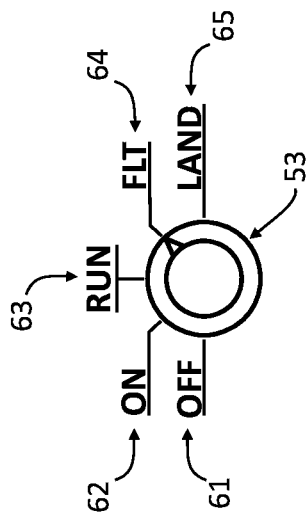
FIG. 4a illustrates an example 5 position Phase Selector Switch—schematic layout
FIG. 4b illustrates example function for a 5 position Phase Selector Switch

FIG. 4a is a schematic illustration of an exemplary five fixed position knob control (53) for normal check list selection. The knob may be similar to knob (52) but with an additional LAND position (65).

FIG. 4b defines example knob logic for the knob of FIG. 4a: Shifting from OFF to ON may initiate a before-start Checklist (31). Shifting from ON to RUN may initiate engine start and before-taxi Checklists (32, 33). Shifting from RUN to FLT may initiate before-takeoff Checklist (35) or after-takeoff Checklist (41). Shifting from FLT to LAND initiates a landing Checklist. (45). Shifting from LAND to RUN may initiate after-landing Checklist (36). Shifting from RUN to ON may initiate a shutdown Checklist (37). Shifting from ON to OFF may initiate a secure Checklist (38).

Figures 5, 6:
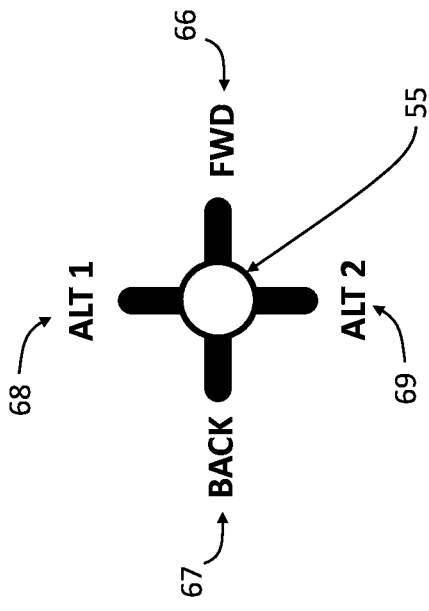
FIG. 5 illustrates an example momentary 4/6 Phase Selector Switch)—schematic layout
FIG. 6 illustrates a momentary 4/6 Phase Selector Switch—function

FIG. 5 is a schematic illustration of a switch 55, spring loaded to the center, that has four momentary positions. The function of each position may be a function of the phase of the Checklist e.g. as represented by suitable graphics such as the graphics of FIGS. 7a-8L. The switch may enable selection of a normal (as opposed to emergency) check list during aircraft operation. The switch may be spring centered to its neutral position e.g. the center. The switch's four momentary positions are: FWD (66), BACK (67), ALT1 (68) and ALT2 (69). These positions support navigation through all optional normal Checklist/s e.g, as illustrated e.g. in FIG. 1c. The actual status and optional next Checklist may be presented suitably to a pilot e.g. displayed as shown in FIGS. 7a-8L.

Figure 1C:
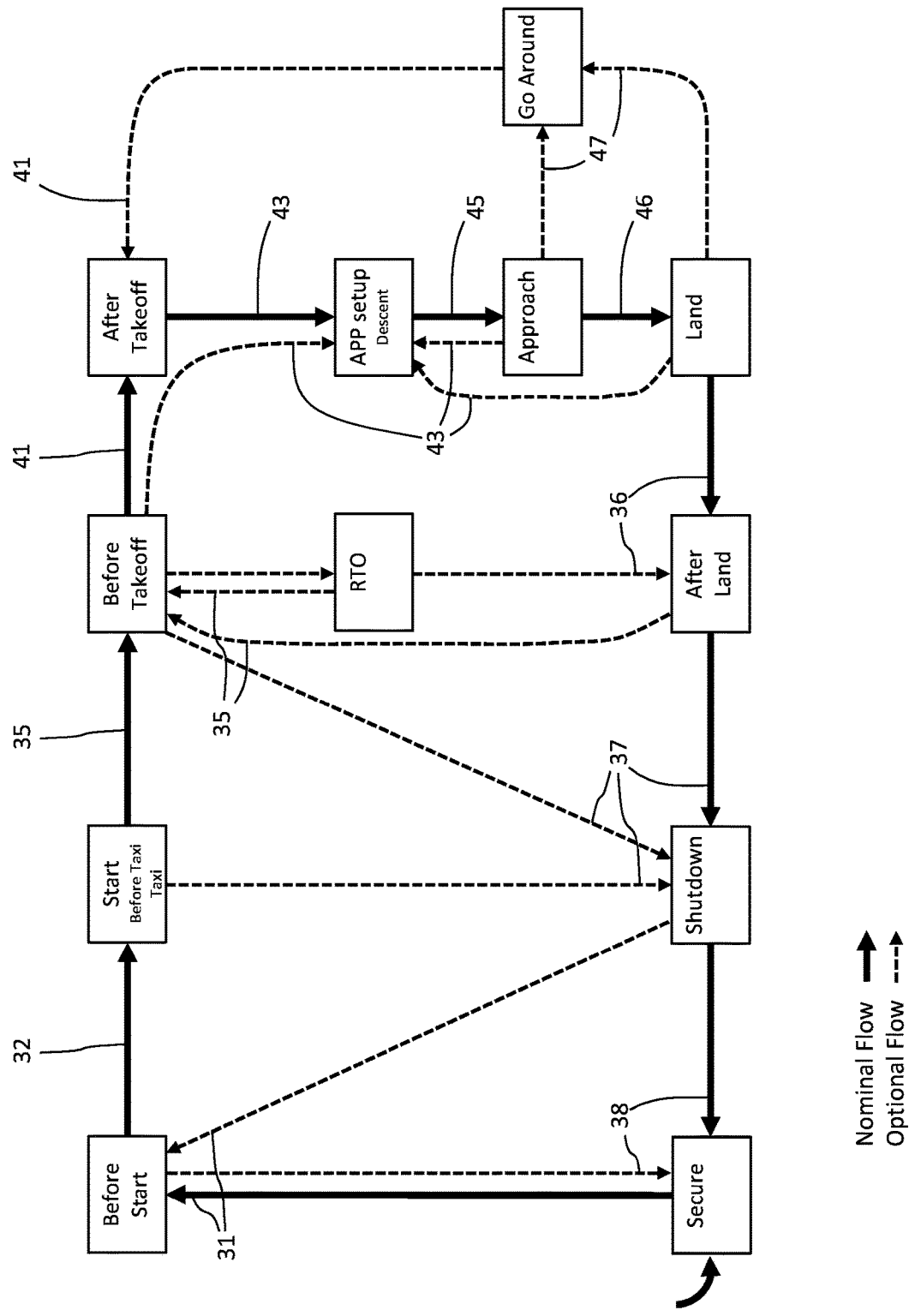
FIG. 1c illustrates an alternative normal checklists flow chart including only manual selected checklists.

FIG. 6 defines example switch logic e.g. momentarily pushing the switch of FIG. 5 to FWD (or back) position selects to execute the next nominal (or previous) Checklist. FIG. 1c represents this sequence in the broad arrows flowing from reference numeral 32 to reference numerals 35, 41, 43, 45, 46, 36, 37, 38. In FIGS. 7a to 7l these options are marked in bold. Momentarily pushing to AFT position selects the previous nominal Checklist when available (availability is indicated in FIGS. 7a-8L by a dashed line).

FIGS. 7a-L and 8a-L are sequences of states for example screen displays which may be displayed e.g. in the cockpit as an aircraft proceeds through flight—all in accordance with the logic of the AMC shown and described herein; and may be schematic options for display of normal Checklist status. The display enables the pilot to recognize Checklists that have been completed, their status (complete, uncompleted), an indication of the next nominal Checklist to request and of alternative Checklists. In FIGS. 7a-L all normal Checklists are presented whereas in the more "minimal display" embodiment FIGS. 8a-8L, only last, next and alternative Checklists that can be initialized, are presented. Other variations are, of course, possible.

The Checklist status display indicates graphically: previous Checklist that was initiated e.g. checklist most recently initiated, the status of previous initiated Checklist e.g. in process, completed successfully (as marked in the illustrated embodiment by a checkmark), completed with a fault that enables continuing the flight or failure that prevents flight from proceeding—all in accordance with the logic of the AMC shown and described herein.

Figure 7A:
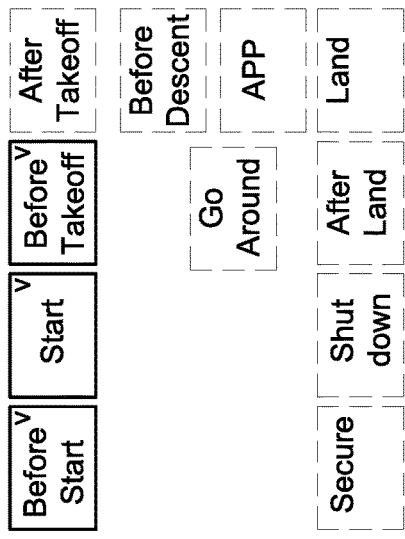

FIGS. 7a, 8a indicate that the before-start Checklist has been completed successfully, the next normal Checklist is start, and an alternative Checklist is secure. Here, the pilot would, when seeing this display, probably select the "start" checklist but may, as per his human judgment, also select the "secure" checklist. More generally, for each display state shown in FIGS. 7a-8L, the pilot would, when seeing this display, probably select the "nominal next" checklist but may, as per his human judgment, also select the "alternate next" checklist.

Figure 7B:
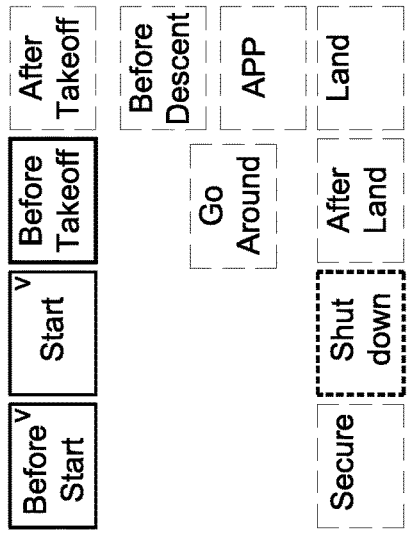

FIGS. 7b, 8b indicate that the start Checklist has been completed successfully, the next normal Checklist is before takeoff and an alternative Checklist is shutdown.

Figure 7C:
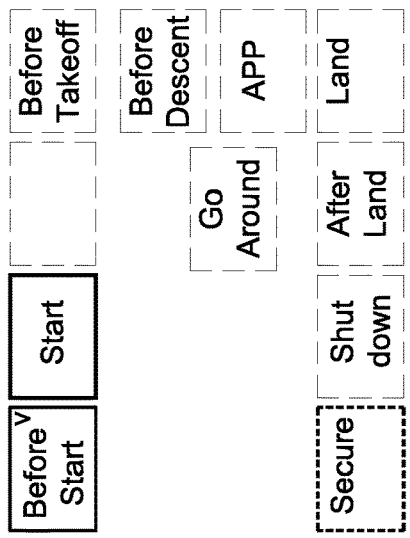

FIGS. 7c, 8c indicate that the takeoff Checklist was completed successfully with aircraft on ground, the next normal Checklist is not yet available, and an alternative Checklist is shutdown.

Figure 7D:
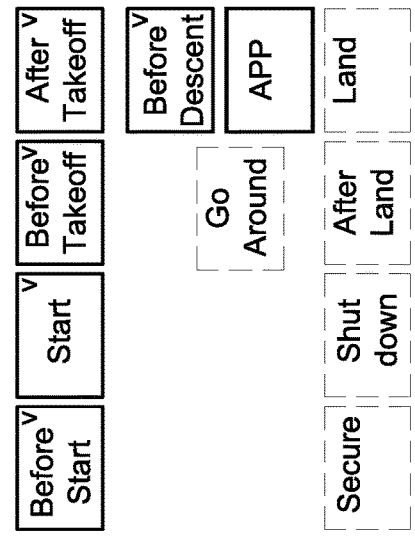

FIGS. 7d, 8d indicate that the takeoff Checklist has been completed successfully with aircraft in the air, the next normal Checklist is after-takeoff and an alternative Checklist is before-descent.

Figure 7E:
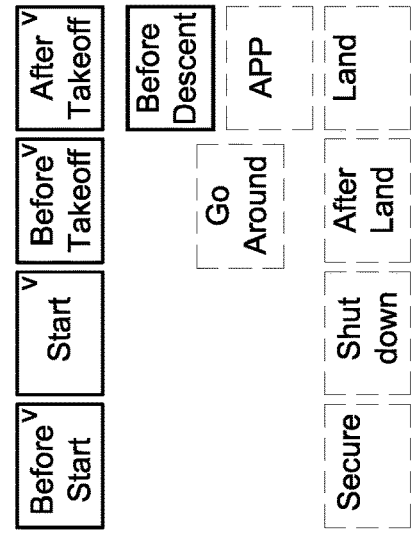

FIGS. 7e, 8e indicate that the after-takeoff Checklist has been completed successfully, the next normal Checklist is before-descent and there is no alternative Checklist.

Figure 7F:
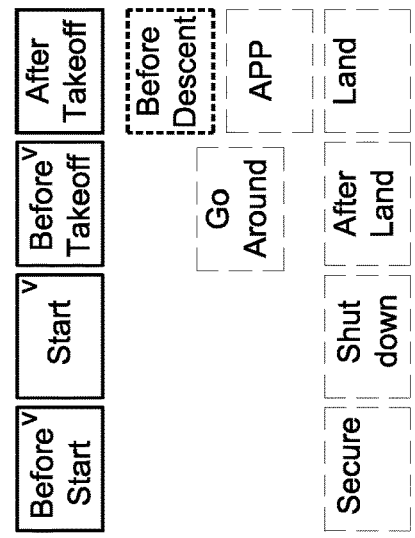

FIGS. 7f, 8f indicate that the before-descent Checklist has been completed successfully, the next normal Checklist is approach (app) and there is no alternative Checklist.

FIGS. 7g, 8g indicate that the approach Checklist has been completed successfully, the next normal Checklist is land, and alternative Checklists are approach setup or go-around, respectively.

FIGS. 7h, 8h indicate that the land Checklist has been completed successfully with aircraft in the air, the next normal Checklist is not available yet, and the alternative Checklist is go-around.

FIGS. 7i, 8i indicate that the land Checklist has been completed successfully with aircraft on ground, the next normal Checklist is after-landing, and an alternative Checklist is before-takeoff.

FIGS. 7j, 8j indicate that the after-land Checklist has been completed successfully, the next normal Checklist is shut down and an alternative Checklist is before-takeoff.

FIGS. 7k, 8k indicate that the shutdown Checklist has been completed successfully, the next normal Checklist is secure and an alternative Checklist is before-start.

FIGS. 7L, 8L indicate that the go-around Checklist has been completed successfully, the next normal Checklist is after-takeoff and an alternative Checklist is approach.

If the display is presented on a touch screen, touch of the next available Checklist may activate that Checklist e.g. to trigger the system shown and described herein to automatically perform that Checklist.

Color and/or graphical cues may be presented to the pilot in any suitable manner, such as but not limited to those actually illustrated.

Man Machine Interface (MMI)—Cockpit

Figure 9A:
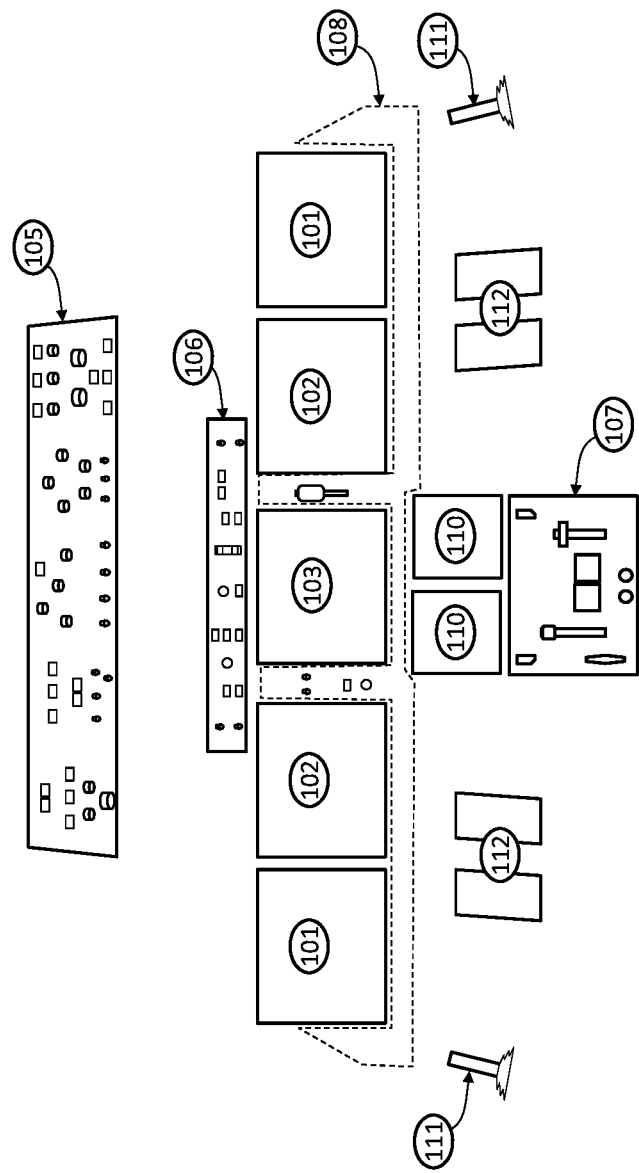
FIG. 9h illustrates an example single cockpit pilot MMI fit to support Checklist auto execution
FIG. 10a conceptual function block diagram of a prior art Aircraft system
FIG. 10b conceptual function block diagram of a state of the art aircraft also being part of the prior art.

FIG. 9a (prior art) depicts a conventional airborne MMI provided in many state of the art aircraft (such as, for example IAI G-280) and which may provide some or all of the following monitor and control functions:

(101), (102) and (103) are display units that provide aviate, navigate, and system monitoring data. (110) are avionics display and control panels and (111) (112) are stick and pedals flight controls.

(105), (106), (107) and (108) represent knobs, push buttons and manual switch panels that enable a pilot to control aircraft systems.

When a system is operated by an automatic system in parallel to a manual option, the conventional airborne MMI may cause a problem: when the automatic system selects a new set up, the control switch, if not repositioned, can mislead the pilot. Changing the conventional mechanical switch position raises complexity and reliability issues.

Figure 9B:
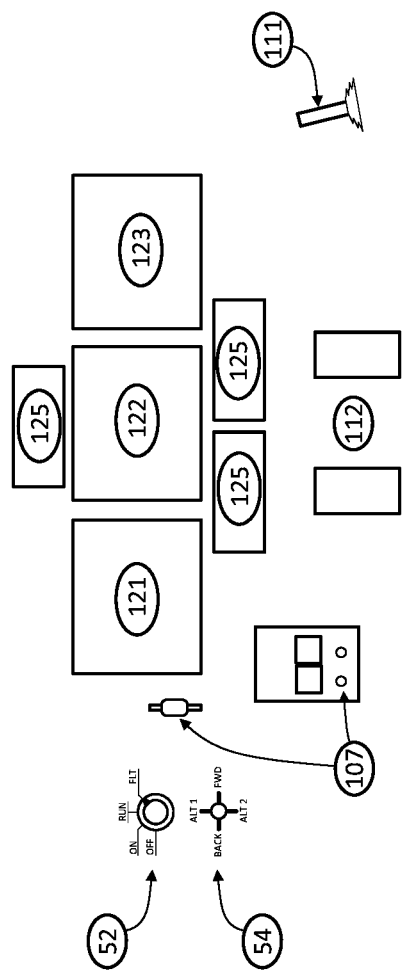

FIG. 9b represents an example airborne MMI which optimizes the MMI of FIG. 9a in that all many or most of the mechanical controls that enable pilot inputs to the aircraft (105-108) are replaced by display and control panels (125) and the displays themselves (121-123) can be touch screen as well. This enables the touch screen to provide graphical presentation of the correct switch position whether the switch's position was set by the pilot or by automation. Execution of all input is done by computer, whether initiated by the pilot, or the system.

The MMI typically includes some or all of:

(125)—display and control panels that enable most of the control functions including: auto pilot, flight management system (FMS) and system controls. These may be touch screens and have momentary switches that make control status easy to synchronize with a remote pilot MMI e.g, on the ground;

Displays (121), (122), and (123) which present primary flight display (PFD), NAV and systems status respectively.

The number of controls that control a system directly (107) is typically reduced e.g. as shown; these controls are typically momentary-type, which enable easy synchronization with remote pilot MA II System Architecture as Per Certain Embodiments Prior art FIG. 10a illustrates a current modern aircraft (e.g. IAI G-200, G-280). In this aircraft the non-avionics systems (5) are operated mainly by dedicated cockpit controls for each system (6). The systems are monitored mostly through conventional avionics: Data concentrated units (DCU) (3) may collect the system parameters and forward them digitally to the conventional avionics (2). The conventional avionics may present the systems status through the avionics main machine interface (AMMI), (1). The AMMI may include non-avionics systems status and synoptic displays and crew alert system (CAS) directed to the pilots. Electrical power destitution unit (PDU) (4) is not controlled by the avionics. It is appreciated that this technology renders system operation, by the avionics, impossible.

Prior art FIG. 10b illustrates a category of state of the art aircraft (exemplified by Eclipse, Pc-24) in which the non-avionics system is electronically or digitally controlled and/or monitored e.g. may be monitored and operated by an aircraft system computer (ASC) (7) which typically replaces the DCU and enables not only monitoring but also operation of non-avionics systems by the avionics. The electrical digital power distribution unit (8) may be controlled by the avionics as well. This technology enables the avionics to control the non-avionics system and to eliminate wholly or partially the non-avionics dedicated cockpit controls (6). The avionics man machine interface (AMMI) may even become the sole pilot interface with the aircraft (10).

FIGS. 10c and 12 are functional block diagrams illustrating aircraft system suites which integrate functionalities provided in accordance with certain embodiments of the present invention.

According to certain embodiments, ASC technology (aka "the ASC concept"), characterized by its capability to operate the systems including digitally controlling and operating the non-avionic systems via a computer (ASC) is combined with an aircraft management computer (9) module that includes logic to select at least one checklist and/or procedure to be executed. The AMC may receive the aircraft non-avionics parameters and diagnostics e.g. from the ASC and/or the aircraft flight status and pilot inputs e.g. from the avionics. By processing these inputs the AMC identifies a checklist to be automatically performed (e.g. as described hereinbelow). During the automatic checklist execution the AMC typically generates sequencing of the system set ups and monitoring checks e.g. as defined by the aircraft certified checklist.

FIG. 10c illustrates a typical bus topology system with multi transmitter multi sink data bus (e.g. ARINC 629 or MIL 1553). The "conventional avionics" (2) may include functional components such as, typically: Flight management system (FMS, 247). Man machine interface in the cockpit (MMI, 10), sensors including: air data sensors (ADC, 241), navigation system (NAV, 242), communication including voice and data (COM, 243), weather radar (WX, 244), traffic collision avoidance systems (TCA, 245), ground proximity avoidance (GPA, 246). Aircraft non avionics systems (5) typically include 7-14 systems according to aircraft complexity, are typically monitored and controlled by the aircraft system computer (7) and typically get their power from a digital power distribution unit (DPDU, 8). A data link to ground station (DL, 147) enables monitoring and potential control by remote pilot. High speed, redundant data bus (230) typically enables connectivity between all components. The AMC module (9) typically has accessibility to receive and transmit to the "conventional avionics" including FMS and MMI and to the non-avionics systems through the ASC and the DPDH.

FIG. 12 illustrates a typical point o point data links topology system with single transmitter single sink data links (as ARINC 429 or Garmin HSDB). The non-avionics systems (5), aircraft system computer (7), digital power distribution unit (8) and aircraft management computer (9) and the connection in-between those may be similar to FIG. 10c The avionics may include an avionics integrated unit (260) that interfaces with each of the sensors (270). The sensors typically include some or all of the following functions: ADC, NAV, COM, WX, TCA, GPA e.g. as shown in FIG. 10c. The man machine interface (410) may be similar to that of FIG. 10. It is appreciated that in contrast to the apparatus of FIG. 10c, a point to point high speed data bus (131) interfaces in-between the display units (DU), touch screens (TS), IAU, AMC and ASC and provides a communication net between these units.

Normal Checklist Selection

Various (e.g. the 3 shown) types of Phase Selector Switch controllers (on/off switch or pushbutton and elements 51-53, 55) and touch screen (FIGS. 7a-8L) may enable several combinations of embodiments described herein, e.g. as shown in FIG. 11. All the options may include a "hard switch" for initial activation and final securing of the system and a "soft switch" for selecting intermediate Checklists. Following is the description of options (aka embodiments) illustrated in FIG. 11; it is appreciated that these may be suitably combined or modified as appropriate and are not intended to be limiting:

Embodiment A includes ON/OFF switch which may initiate before-start (31) or secure (38) Checklists whereas a "soft switch" (55 and/or touch screen) may be used to select all other Checklists (32, 35, 41, 43, 45, 46, 36, 37).

Embodiment B1 includes a three position Phase Selector Switch (51—FIG. 2a) that enables to select before-start, start, shut down and secure Checklists (31, 32, 37, 38) and a "soft switch" (55 and/or touch screen) to select all other Checklists (35, 41, 43, 45, 46, 36).

Embodiment B2 is similar to B1 except that before-takeoff Checklist (35) is initiated automatically after-Start Checklist and does not require additional pilot selection. Embodiment C includes the four position Phase Selector Switch (52—FIG. 3a) that may enable to select before-start, start, before-takeoff, after-landing, shut down and secure Checklists (31, 32, 35, 36, 37, 38) and a "soft switch" (55 and/or touch screen) to select all other Checklists (41, 43, 45, 46, 36). In this option ground Checklists are selected by (52) and in the air Checklist are selected by "soft switch".

Embodiment D includes the five position Phase Selector Switch (53—FIG. 4a) that may enable to select before-start, start, before-takeoff, land, after-land, shutdown and secure (31, 32, 35, 36, 37, 38).

Embodiment E is similar to Embodiment D except that before-takeoff Checklist (35) is initiated automatically after-Start Checklist and does not require additional pilot selection. The FLT position is used to initiate after-takeoff Checklist.

In all the embodiments shown in FIG. 11, the Checklist status (55 and/or touch screen) may be displayed on one of the display units.

RTO Checklist may be selected automatically when RTO logic is applied. Go-around Checklist may be selected automatically when pilot presses the TOGA switch or may be selected manually by "soft switch".

According to certain embodiments, given a new aircraft under development or a certified (legacy) aircraft, in which non-avionic systems (and of course avionics) are computer-controlled, the checklist as described in some or all of: the aircraft flight manual (AFM), the minimum equipment list (MEL) and generic common pilot practice is used to program auto execution of at least one checklist, e.g. by converting the natural language checklist to automated AMC logic. Then, an AMC-ASC interface may be provided which allows the AMC to receive non-avionics control status notifications from the ASC and to command the ASC to automatically perform operations mandated by relevant checklist/s, accordingly, in accordance with predetermined automation logic. It is appreciated that ASCs with interfaces exist today e.g. Eclipse 500 ASC supplied by Curtiss-Wright and Pc-24 ASC supplied by IS & S such ASCs may be adapted to incorporate the interface logic and functionality described herein.

The order of actions in the AFM (aircraft flight manual) checklist may be driven to maintain smooth flow of pilot's actions through the controls panels. Auto checklist order of actions may be optimized to reduce procedure time including parallel actions (new action starts before the previous ended). The auto execution embodiment may take into account preconditions to a specific action, if they exist, or electrical load picks. Pilot may be able to stop or continue a checklist during its execution.

Any suitable procedure for unmatched expected and actual indications may be employed. For example, any failure indication (e.g. mismatch between expected indication and actual reported indication) may trigger a crew alert message.

Typically, in parallel on the ground, the AMC may check the CAS message against the minimum equipment list (MEL) and indicate to the pilot if a dispatch is permissible and if there are any limitations to dispatch with the problem. (e.g. failure in pressurization system may enable dispatch but with a max altitude limit).

The order of action in the aircraft flight manual (AFM) Checklist need not necessarily be maintained in the automated version. This is because conventional (manually executed) checklists are arranged to promote smooth flow of the pilot's physical interaction with his control panel. For example, a "normal" checklist may be arranged to allow the pilot to interact first with the leftmost elements of his control panel, proceeding left to right and interacting last with the rightmost control panel elements. In contrast, the order of the auto checklist may be selected to reduce procedure time. For example, plural actions may be performed in parallel or more generally a next checklist action may begin before the preceding action has been completed. However, the order may be designed taking into account actions' preconditions one action on the checklist may have a precondition associated with another action, in which case the latter action may be performed earlier in the checklist than the former action (the latter action may appear before the former, in the checklist).

Typically, a conventional manual override may allow a Pilot able to arrest and then resume Checklist during automatic execution thereof.

Typically, auto execution is designed to act upon pre-defined pre-conditions for specific actions if such exist (the logic may ensure that such actions would only begin if a check has determined that the pre-conditions are satisfied) or electrical load peaks. (e.g. when electrical load characteristic of some consumers has a higher load peak when initialized, those systems may be activated in a staggered fashion to avoid high cumulative electrical load peak).

According to certain embodiments, a GUI is provided to facilitate the pilot's interaction with the logic. Typically, the GUI allows the pilot to initiate checklists e.g. by defining a flight-phase or other aircraft state by directly selecting from a checklist menu and/or to receive an output indication confirming that a checklist has been performed successfully/unsuccessfully. It is appreciated that predefined logic may define the pilot-determined flight-phase or other aircraft state as a trigger or the sole trigger for certain checklist/s.

Phases which the pilot may define e.g. by selecting from a menu of phases, may include before-start, start, before-take off, after-landing, shutdown, and so forth. A checklist, aka CHL, may include several types of actions, AKA operations or phases, which must be performed. The following description defines how automation logic may be defined (and subsequently coded and/or stored in computer memory) for each of 6 types, any or all of which may be present in a specific checklist:

Type 1 actions: confirm System set up controls (avionics and non-avionics) are correctly set; (if not, manipulate controls, e.g. by type 3 or type 5 actions, to the required set up defined by the Checklist)

The Aircraft Flight Manual Checklist includes at least one controller's name and the required mode in which the controller is expected to be.

To enable auto execution of system set up confirmation checks all or any subset of:
  (a) A list of all pilot controls the Checklist refers to may be set by the aircraft systems' designers according to each system definition.
  (b) The AMC-ASC interface may be designed to receive notifications of all the above non-avionics controls from ASC and the AMC-avionics interface may be designed to receive notifications of all the above avionics controls status from the legacy avionics.
  (c) For each Checklist phase a list of controls and the set up thereof as required by the checklist may be defined and stored in computer memory. (e.g. At before-start Checklist, landing gear controller may be confirm at down position)
  (d) When a new Checklist phase is activated, the AMC may compare the required position as defined in (c), to the actual status. If required and status match, the process ends. If required and statuses don't match then:
    a. Suspend following actions that are conditioned by this controller
    b. set whichever controls don't match, to the correct position e.g. as described below with reference to type 2 actions.

Type 2 actions: confirm System indications (avionics and non-avionics) parameters are within tolerance The Aircraft Flight Manual Checklist includes indications e.g, hydraulic fluid quantity) which the pilot conventionally needs to confirm are within acceptable tolerances of a stipulated value or level.

To enable auto execution of system parameter checks, some or all of the following may be performed:
  (a) A list of all system parameters (avionic and non-avionic) the Checklist refers to may be composed and stored in computer memory.
  (b) The AMC-ASC interface may be designed to receive all the non-avionics parameters from ASC and the AMC-conventional avionics interface may be designed to receive all the parameters from the aircraft's legacy avionics.
  (c) For each Checklist phase a list of parameters and their acceptable tolerance may be defined (and stored in computer memory) in accordance with the Aircraft Flight Manual definitions. The acceptable tolerance may be a function of other parameters (For example, hydraulics accumulator nitrogen pressure may be a function of the accumulator temperature).
  (d) When a new Checklist procedure is activated, the AMC may compare the required tolerance to the actual parameter status. If required and status parameters indications match, the process ends. If required and status indications don't match, execute some or all of:
    1. Generate an alert message to be displayed by the avionics to pilot.
    2. Suspend following actions that are conditioned by this parameter.
    3. On ground, sent the unmatched parameter to a dispatchability module, aka Minimum Equipment List module.

An example Minimum Equipment List module, for handling some or all foreseen failures, is now described in detail. MMEL comprises a categorized list of on-board systems, instruments and equipment that may be inoperative for flight. Specific procedures or conditions may be associated with operation of the relevant item. It may be considered by default that any equipment or system related to airworthiness which is not included in the MMEL is required to be operative. The MMEL is defined on a per aircraft model basis. A Minimum Equipment List may be a derivative of the MMEL tailored to the operator's specific aircraft and operating environment. Dispatch, given a scenario of missing or failed equipment, can done only if approved by the Minimum Equipment List and according to the defined limitations for that scenario. To enable a Minimum Equipment List module to assist pilot decisions to dispatch when a failure is detected, some or all of the following may be performed:
  a. A list of all pilot CAS messages may be set and a list of all system parameters that have expected normal values may be set with their normal indication values by the aircraft systems designers according to each system definition. The normal expected values may be a function of state of operation or other parameters. This may occur as part of (a) specified herein, for actions of each of Types 2, 3 and 4.
  b. The AMC-ASC and AMC-avionics interface may be designed to receive all the above CAS messages and system parameters.
  c. For each CAS message or out-of-normal parameter indication, an association to the proper Minimum Equipment List reference (if there is such) may be defined.
  d. During execution of the before-flight Checklists, whenever a CAS message or a mismatch of actual indication versus the normal expectation is detected, the associated Minimum Equipment List reference defined in (c), may be displayed to the pilot with an ensuing go/no go indication.

Type 3 actions: manipulate controls in non-avionics system to change non-avionics system's state The Aircraft Flight Manual Checklist typically includes controllers' names and required new modes therefor. The Checklist may include a stipulation to confirm the outcome of the change or this may be defined by good piloting practice. To enable auto execution of non-avionics system new set up, all or any subset of the following may occur:
  a. A list of all pilot controls the Checklist refer to may be set by the aircraft systems designers according to each system definition.
  b. The AMC-ASC interface may be designed to receive all the above non-avionics controls status from ASC and may have the ability to command the ASC for systems setup change.
  c. For each Checklist phase the procedure of system set up change may be defined (and stored in computer memory) as defined by the Aircraft Flight Manual Checklist, including some or all of:
    i. List of systems controller changes to new operation state (For example, hydraulic pump set from OFF to AUTO position). The list may include pre conditions where ever they are checklist-defined (For example, the checklist may stipulate activation of air conditioning only TBD sec after APU was started)

ii. For each change define (and store in computer memory) indications and their expected value and time response tolerances (For example, low hydraulic pressure signal—extinguish in 2sec and pressure rise up to the expected pressure, within a defined tolerance range, in 10sec)

iii. For some items the list may include "if" logic. Pending certain conditions or a response from the previous action—if a defined response is detected, certain additional actions may be required (For example, in engine start scenario, if oil pressure dose not respond when RPM above TBD, than shutoff the fuel, and otherwise continue to next checklist operation)

iv. For some critical items in a Checklist, pilot confirmation may be needed (For example, accept a flight plan received from a mobile device or data link). The condition to execute these items may include a pilot confirmation. (For example, a message may be presented "Confirm—flight plan". When pilot confirms, using any suitable input device e.g. pressing on the message on a touch screen, the system may receive the confirmation and execute the flight plan).

d. When a new Checklist phase is activated, the AMC may command the ACS to initiate the new set ups and then monitor the system's indications including comparison thereof to their respective preset tolerances. If required and actual indications match, the process ends. If required and actual indications don't match:

1. Generate an alert message to be displayed by the avionics to pilot.
2. Suspend any subsequent actions that are conditioned on this parameter.
3. On ground, sent the unmatched parameter to dispatch ability module.

Type 4 actions: avionics system set up

The Aircraft Flight Manual Checklist may for example include any or all of the following 3 types of avionics systems' set up operations:

1. Data inputs typically include input data to the FMS (for flight plan, departure, arrival, performance, data link message and QNH), and to communication and identification systems (frequencies and codes).
2. Selecting mode of operation (e.g. navigation source or auto pilot mode)
3. set up of Displays it is desirable for execution of avionics set up to be as automatic as possible, but conventionally, this automation is often limited by ATC voice communication, need to accommodate pilot improvisation and personal preference. In some flights most of the inputs may be defined before the flight by a dispatch service or by the pilot and may be transferred to the aircraft automatically through data link or portable device during a "before-start" Checklist. To enable auto data input to the avionics, some or all of the following may be performed according to certain embodiments:

(a) A list of all pilot data inputs to the avionics may be set.
(b) An AMC-Avionics interface may be configured to enable the above data to travel from the AMC to the avionics and/or to enable AMC to control data transfer from the data link or from portable memory device to the avionics.
(c) For each Checklist phase a list of inputs required according to the Checklist may be defined and stored in computer memory. The list may include input to be set (For example, payload weight) and inputs for which a predefined default can be accepted when no new input is set (For example, winds).
(d) When a Checklist procedure is activated, according to certain embodiments, the AMC may check if any needed inputs have previously (or manually) been defined or are otherwise available e.g. through data link or portable device. If inputs are available the avionics system may be set up and displayed. Pilot confirmation may be needed to activate the set up. If required data was completed and confirmed when required, the process ends. If data is missing a missing data message may be presented. If data input was complete but lacks pilot confirmation when required, a confirm-reminder message may be presented to the pilot.

Selecting avionics mode of operation may be performed e.g. as described above with reference to type 3, however an AMC-Avionics interface may be used rather than an AMC-ASC interface.

Set up of Displays may be optimized according to the phase of flight. In today's aircraft usually the pilots are required to make a manual flight-phase determination e.g. by selection. The auto Checklist may have a pre determine set up for each phase. Activation of a Checklist, according to certain embodiments, may include a display set up. Pilot may have a conventional manual override.

Type 5 actions: activating System tests (avionics and non-avionics)

The Aircraft Flight Manual Checklist includes system tests comprising activation of a system test followed by monitoring some parameters to ascertaining that the system has passed the test For systems that typically have a built in test (BIT) that needs today pilot activation, the auto Checklist execution may perform the Built In Test activation automatically.

For system whose testing relies on a pilot's manual operation of a control/s and then checking for the correct response, the procedure may be done automatically. (e.g. to test flap operation at after start Checklist, the control may be set automatically to an extent position then the indicator may be monitor to confirm the indication indicate the extension correct position and then setting it back up and confirming the indication is up).

The method to do these actions is similar to type 3 and 4 actions described above. Certain checks may require manual operation (For example, checking wheel control and pedals) in which case, when auto execution of a Checklist has been accomplished the complete message may be pending on the pilot performing his manual check. Until than a message may be presented to the pilot prompting her or him to perform the required manual check. (For example, flight control sweep prompt may appear until flight control sweep has been performed by the pilot). The system may determine the test was done either automatically (For example, through flight control surfaces position sensors) or by pilot confirmation (For example, touch the flight control sweep message on a touch screen).

Type 6 actions: Communicating with external authorities

The Aircraft Flight Manual Checklist may include certain items which refer to communication with ground crew and air traffic control (ATC). Conventionally, whenever voice communication is required it may be done manually by the pilot. Alternatively all communication may occur by data links that can be controlled and monitored automatically in which case these checklist items may be executed automatically by the system of the present invention.

To enable data link communication by auto execution Checklist system, some or all of the following may be performed:

(a) A list of all available data link communications the Checklist refers to may be set, for example: automatic terminal information service (ATIS), departure clearance (available in some US airports), CPDLC flight plan update and position reports (available over the Atlantics).

(b) The AMC-DL interface may enable control of data link operation and the avionics-DL interface may enable the required data transfer.

(c) For each Checklist phase that includes an automatic data link, define (and store in computer memory) some or all of:
  i. A method to automatically activate a data link request (For example, in a "before-start" Checklist, a data link request for ATIS update to the confirmed departure airport may be sent to the avionics automatically instead of requiring a pilot request to be conveyed via the FMS display)
  ii. The parameters required from the received DL message and the client module for each data (For example, runway in use to flight plan departure, QNH to set altimeter and temperature wind and runway conditions to runway performance)

(d) When a new Checklist phase is selected, the defined data links for this phase may initiate data request, and/or the data received may be sent to the relevant module.

An example method for aircraft operation is now described, which includes performing predefined normal checklist procedures (for example the procedures including a before-start procedure, a start procedure, a before-taxi procedure, a taxi procedure, a before-takeoff procedure, an after-takeoff procedure, etc.). At least one of a legacy avionics system, a legacy ASC-concept non-avionics system and aircraft management module, on board the aircraft, are configured and operative to perform at least one of the procedures described hereinbelow including plural pre-defined operations which at least one of the legacy avionics and legacy ASC-concept non-avionics systems are configured and operative to perform. The method typically includes providing an aircraft management Module (AMC) which has stored checklists and controls some or all of the following operations accordingly. Operations include some or all of:

a. responsive to manual initiation of a before-start procedure, automatic execution of the before-start procedure;
b. responsive to manual initiation of a start procedure, automatic execution of the start procedure if and only if the before-start procedure was completed successfully;
c. if and only if the at least one start procedure was completed successfully, automatically initiating automatic execution of a before-taxi procedure;
d. if and only if the before-start procedure was completed successfully and the aircraft is in motion, automatically initiating automatic execution of a taxi procedure;
e. if and only if the before-taxi procedure was completed successfully, initiating and, responsively, automatically executing a before-takeoff procedure;
f. responsive to manual initiation of an after-takeoff procedure, automatically executing the after-takeoff procedure once predetermined safety conditions are found to have been reached. Different conditions may be set for different actions; for example, a. condition for jet aircraft may be that all procedures may be pending on height above runway>10 ft and ROC>100 feet/min. Flaps retraction by height above runway>400 feet and speed above next flap set up and accelerating. Thrust retraction to climb at height above runway>1.000 ft).(EP aircraft air speed+ROC+minimum aircraft altitude above ground are all normal).
g. responsive to automatic detection of at least one flight condition, e.g. climb above transition altitude, automatically initiating and responsively executing an altitude transition procedure;
h. automatically initiating a default system set up when a predetermined condition, determined by a pre-entered flight plan, is automatically determined to have been reached; and/or responsive to manual initiation of a descent procedure, automatically executing the descent procedure comprising plural descent and approach preset operations, automatic execution of at least some of the descent and approach set up operations. Typically, execution is triggered by the pilot, however this requires data without which execution is not completed, and, instead, a warning to the pilot is generated. Such a condition may for example comprise that m minutes of flight time are estimated to remain before descent, and/or that k kilometers of trajectory are estimated to remain before destination is reached.
j. responsive to at least one automatically detected flight condition, automatically initiating and responsively executing a flight-level transition procedure;
k. responsive to manual initiation of an approach procedure comprising plural approach operations, automatic execution of at least some of the approach operations. At least some of the approach operations may be executed only if predetermined flight conditions, e.g. pertaining to height above destination, range, speed, are detected;
l. responsive to manual initiation of a landing procedure comprising plural landing operations, automatic execution of at least some of the landing operations if and only if the approach procedure has been completed successfully;

Typically, at least some of the landing operations are executed only once a predetermined aircraft speed limit is automatically detected to have been achieved.

Typically, the landing operations which are executed only once a predetermined aircraft speed limit is automatically detected to have been achieved, include extension of the aircraft's landing gear and wing flaps.

m. responsive to manual initiation of a go-around procedure including plural go-around operations, automatic execution of at least some of the go-around operations;

Typically, at leak one of the go-around operations is executed only once a predetermined aircraft condition is automatically detected to have been achieved;

Typically, the predetermined aircraft condition comprises positive ROC and height below a predetermined height threshold and wherein the go-around operation, executed only once the predetermined aircraft condition is automatically detected to have been achieved, comprises retracting landing gear.

Typically, the predetermined aircraft condition comprises aircraft speed below a predetermined speed threshold and wherein the go-around operation, executed only once the predetermined aircraft condition is automatically detected to have been achieved, comprises retracting previously extended flaps.

n. responsive to initiation of an after-landing procedure, automatic execution of the after-landing procedure only once landing at taxi speed has been automatically detected.

p. responsive to manual initiation of a shutdown procedure, automatic execution of the shutdown procedure if and only if the aircraft is automatically detected to be on ground and stationary.

q. responsive to manual initiation of a securing procedure, automatic execution of the securing procedure if and only if the shutdown procedure is automatically detected to have been completed successfully.

Typically, if a procedure was not completed successfully in TBD sec, a crew alert may be generated with the status display of uncompleted items. In the auto execution checklist logic, preset condition related system parameters, time to respond or to succeed in previous items completion, may be defined to each operation item.

According to certain embodiments, a system is provided which is operative to control execution of predefined normal checklist procedures which at least one of a legacy avionics system and a legacy (e.g. ASC-concept) non-avionics system, both on board the aircraft, are configured and operative to perform, (the procedures including a before-start procedure, a start procedure, a before-taxi procedure, a taxi procedure, a before-takeoff procedure, an after-takeoff procedure, etc.), at least one of the procedures including plural predefined operations which at least one of the legacy avionics system and the legacy non-avionics system are configured and operative to perform, the system comprising:

At leak one manual input device allowing a human pilot, by manipulation of the manual input device, to generate at least one manual input indicating manual initiation of at least one of the predefined checklist procedures; and An AMC (aircraft management computer) processor operative to receive the at least one manual input from the manual input device and including:

first logic operative to determine that at least one predetermined successful completion criterion has been satisfied hence at least a first procedure from among the predefined checklist procedures has been successfully completed;

second logic operative to cause at least a predetermined second procedure from among the predefined checklist procedures to be performed by at least one of the legacy avionics system and the legacy non-avionics system, responsive to manual initiation of the second procedure as indicated by the at least one manual input, if and only if the first logic has determined that the first procedure has been successfully completed;

third logic operative to cause at least a predetermined third procedure from among the predefined checklist procedures to be performed by at least one of the legacy avionics system and the legacy non-avionics system responsive to manual initiation of the third procedure as indicated by the at least one manual input, if and only if at least one predetermined aircraft condition, detectable by at least one of the legacy avionics system and the legacy non-avionics system, has been detected by at least one of the legacy avionics system and the legacy non-avionics system; and fourth logic operative to automatically initiate performance of at least a predetermined fourth procedure from among the predefined checklist procedures including causing at least the fourth procedure to be performed without waiting for manual input from the at least one manual input device.

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including UPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method of aircraft operation, the method comprising:
   accepting a human pilots selection of at least one checklist from among plural checklists stored in computer memory; and
   responsive to the pilot's selection, using a processor for automatically performing all operations included in said at least one checklist
   wherein plural operations, for checking and setting aircraft systems, according to a flight phase, are automatically executed, thereby to define auto-execution;
   wherein the order of auto-execution actions is optimized to reduce procedure time including parallel actions and wherein at least one new action starts before a previous action has ended; and
   wherein said auto execution of an operation begins if a check, by the said processor, has determined that at least one logic pre-condition/s are satisfied;
   wherein said checklist includes checklist auto-execution commands of each of the following action types: Type 1 actions—confirm system set up controls (avionics and non-avionics) are correctly set (if not manipulate controls, to the required set up defined by the checklist); Type 2 actions—confirm system indications (avionics and non-avionics) parameters are within tolerance; Type 3 actions—manipulate controls in non-avionics system to change non-avionics system's state; Type 4 actions—avionics system set up;
   Type 5 actions—activation systems tests (avionics and non-avionics).

2. The method according to claim 1 wherein said accepting comprises providing a switch and associated switch logic that enable manual selection of at least one checklist from among said plural stored checklists.

3. The method according to claim 1 wherein said plural checklists comprise normal checklists.

4. The method according to claim 1 wherein said automatically performing comprises:
   providing at least one data bus providing at least one data interface, governed by at least one predetermined protocol, to at least one computer interfacing with at least one airborne electronically operated system; and
   providing logic operative, responsive to the human selection, to perform said individual checklist including:
      generating commands, each of which are compatible with said at least one protocol and instructing said at least one computer to interface with said at least one airborne system in accordance with an operation from among said plural operations in said individual checklist; and feeding said commands to said at least one computer via said at least one data interface.

5. An aircraft operation device ("AMC"), operative in conjunction with an aircraft having: avionics including avionic subsystems and a man machine interface (MMI), non-avionic systems, and a computer (ASC) operative to control the non-avionic systems, the aircraft operation device comprising:
- a checklist data repository operative to store, in computer memory, plural checklists including digital representations of at least one operation, wherein at least one of the plural checklists includes plural operations, some of which are to be performed in the aircraft's non-avionic systems, and others to be performed in the aircraft's avionic subsystems;
- at least one data bus providing a first data interface, governed by a first predetermined protocol, to said ASC and a second data interface, governed by a second predetermined protocol to said avionics; and
- logic operative to access said checklist data repository and, using a processor, to selectably perform at least one individual checklist from among said plural checklists including:
- generating commands, at least some of which are compatible with said first protocol and instruct said ASC to interface with at least one non-avionic system from among said non-avionic systems in accordance with an operation from among said plural operations in said individual checklist and at least some of which are compatible with said second protocol and instruct said AMC to interface with at least one subsystem from among said avionic subsystems in accordance with an operation from among said plural operations in said individual checklist; and
- feeding said commands compatible with said first protocol to said ASC via said first data interface and said commands compatible with said second protocol to said avionics via said second data interface wherein plural operations, for checking and setting aircraft systems, according to a flight phase, are automatically executed, thereby to define auto-execution; wherein the order of auto-execution actions is optimized to reduce procedure time including parallel actions and wherein at least one new action starts before a previous action has ended; and wherein said auto execution of an operation begins if a check, by the said processor, has determined that at least one logic pre-condition/s are satisfied;

wherein said checklist includes checklist auto-execution commands of each of the following action types: Type 1 actions—confirm system set up controls (avionics and non-avionics) are correctly set (if not manipulate controls, to the required set up defined by the checklist); Type 2 actions—confirm system indications (avionics and non-avionics) parameters are within tolerance; Type 3 actions—manipulate controls in non-avionics system to change non-avionics system's state; Type 4 actions—avionics system set up; Type 5 actions—activation systems tests (avionics and non-avionics).

6. The AMC according to claim 5 wherein said at least one data bus also provides an interface between said logic and said MIMI and wherein said logic provides at least one multi-value signal to a pilot, via said MMI, wherein the signal's plural values respectively indicate at least some of the following statuses of at least one individual checklist: "completed entirely successfully", "completed partially successfully", and "failed".

7. The AMC according to claim 5 wherein at least one individual command from among said commands compatible with said first protocol, instructs said ASC to control at least one non-avionic system from among said non-avionic systems to carry out those of the plural operations performed in the aircraft's non-avionic systems and included in said at least one individual checklist which are to be carried out by said non-avionic systems.

8. The AMC according to claim 5 wherein at least one individual command from among said commands compatible with said first protocol, instructs said ASC to check a desired setting of at least one non-avionic system from among said non-avionic systems.

9. The AMC according to claim 5 wherein said operations which said avionics is instructed to perform comprise at least one of: operating an automatic pilot; and operating an automatic throttle.

10. The AMC according to claim 5 wherein at least one individual command from among said commands compatible with said second protocol, instructs said AMC to control at least one avionic subsystem from among said avionic subsystems to carry out those of the plural operations performed in the aircraft's avionic subsystems and included in said at least one individual checklist which are to be carried out by said avionic subsystems.

11. The AMC according to claim 5 wherein at least one individual command from among said commands compatible with said second protocol, instructs said AMC to check a desired setting of at least one avionic subsystem from among said avionic subsystems.

12. The AMC according to claim 8 wherein said command which instructs said ASC to check also comprise logic, pending on a result of the check, which configures at least one subsequent operation in at least one of said plural checklists.

13. The AMC according to claim 5, further comprising a switch and associated switch logic that enable manual selection of at least one checklist from among said plural checklists.

14. The AMC according to claim 5 wherein said first protocol and said second protocol are the same.

15. The AMC according to claim 5 wherein performance of at least one checklist by said logic is triggered by a signal arriving from a ground station.

16. The AMC according to claim 15 wherein the ground station receives from said logic, at least one status of at least one individual checklist.

17. The AMC according to claim 5 wherein performance of at least one checklist by said logic is triggered manually by at least one pilot command conveyed via said interface between said logic and said MMI.

18. The AMC according to claim 5 wherein performance of at least one checklist by said logic is triggered automatically responsive to electronically detected aircraft states.

19. A computer program product, comprising a non-transitory tangible computer readable medium having computer readable program code embodied therein, said computer readable program code adapted to be executed to implement an aircraft operation method comprising the following operations:
- accepting a human pilot's selection of at least one checklist from among plural stored checklists; and
- responsive to the pilots selection, automatically performing all operations included in said individual checklist wherein plural operations, for checking and setting aircraft systems, according to a flight phase, are automatically executed, thereby to define auto-execution; wherein the order of auto-execution actions is optimized to reduce procedure time including parallel actions and wherein at least one new action starts before a previous action has ended, and wherein said auto execution of an operation begins if a check, by the said processor, has determined that at least one logic pre-condition/s are satisfied;

wherein said checklist includes checklist auto-execution commands of each of the following action types: Type 1 actions—confirm system set up controls (avionics and non-avionics) are correctly set (if not manipulate controls, to the required set up defined by the checklist); Type 2 actions—confirm system indications (avionics and non-avionics) parameters are within tolerance; Type 3 actions—manipulate controls in non-avionics system to change non-avionics system's state; Type 4 actions—avionics system set up; Type 5 actions—activation systems tests (avionics and non-avionics).

* * * * *